US011258523B2

United States Patent
Son et al.

(10) Patent No.: US 11,258,523 B2
(45) Date of Patent: Feb. 22, 2022

(54) ELECTRONIC DEVICE FOR DETERMINING FAILURE OF SIGNAL PATH AND COMPONENT, AND METHOD FOR OPERATING SAME

(71) Applicant: Samsung Electronics Co., Ltd., Suwon-si (KR)

(72) Inventors: Yoonkook Son, Suwon-si (KR); Yongjun An, Suwon-si (KR); Yuseon Lee, Suwon-si (KR); Hanyeop Lee, Suwon-si (KR); Joosung Kim, Suwon-si (KR); Hyoseok Na, Suwon-si (KR); Doil Ku, Suwon-si (KR); Hyunsang Kang, Suwon-si (KR); Juho Van, Suwon-si (KR); Chulseung Pyo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 16/772,511

(22) PCT Filed: Jan. 15, 2019

(86) PCT No.: PCT/KR2019/000590
§ 371 (c)(1),
(2) Date: Jun. 12, 2020

(87) PCT Pub. No.: WO2019/143100
PCT Pub. Date: Jul. 25, 2019

(65) Prior Publication Data
US 2020/0389236 A1 Dec. 10, 2020

(30) Foreign Application Priority Data

Jan. 18, 2018 (KR) .................. KR10-2018-0006458

(51) Int. Cl.
*H04B 17/14* (2015.01)
*H04B 17/17* (2015.01)
*H04B 17/29* (2015.01)

(52) U.S. Cl.
CPC ............. *H04B 17/14* (2015.01); *H04B 17/17* (2015.01); *H04B 17/29* (2015.01)

(58) Field of Classification Search
CPC ......... H04B 17/14; H04B 17/17; H04B 17/29
See application file for complete search history.

(56) References Cited

U.S. PATENT DOCUMENTS 8,478,914 B2 * 7/2013 Sato ...................... H04N 5/907
710/68
8,632,668 B2 * 1/2014 Maeda ............... G01N 27/4175
204/424

(Continued)

FOREIGN PATENT DOCUMENTS

JP 2008-211482 A 9/2008
JP 5790407 B2 10/2015

(Continued)

*Primary Examiner* — Dominic E Rego
(74) *Attorney, Agent, or Firm* — Jefferson IP Law, LLP

(57) ABSTRACT

Provided are an electronic device for determining failure of a signal path and a component, and a method for operating the electronic device according to various embodiments. The electronic device comprises: at least one connection part for connection to an external device; a first signal path including an amplifier for amplifying a signal transmitted to the outside of the electronic device; a second signal path for obtaining another signal from the outside of the electronic device; an antenna port electrically connected to the first signal path and the second signal path through a filter circuit; and a communication module, wherein the communication module may be configured to transmit a transmission signal through the first signal path to the antenna port, obtain at least a part of the transmission signal through the second (Continued)

signal path, and determine whether the electronic device is defective on the basis of the transmission signal and information associated with at least a part of the transmission signal. Various other embodiments are possible.

9 Claims, 16 Drawing Sheets

(56) References Cited

U.S. PATENT DOCUMENTS

| | | | |
|---|---|---|---|
| 10,116,347 B1* | 10/2018 | Xu | H03F 3/72 |
| 2005/0090245 A1 | 4/2005 | Kim | |
| 2010/0056083 A1 | 3/2010 | Kim et al. | |
| 2010/0248641 A1 | 9/2010 | Schumacher | |
| 2013/0223330 A1* | 8/2013 | Medbo | H04W 16/26 |
| | | | 370/315 |
| 2013/0315398 A1* | 11/2013 | Chiu | H04R 5/04 |
| | | | 381/17 |
| 2014/0112213 A1* | 4/2014 | Norholm | H04B 1/006 |
| | | | 370/277 |
| 2015/0029355 A1* | 1/2015 | Kim | H04N 5/23229 |
| | | | 348/222.1 |
| 2016/0182119 A1* | 6/2016 | Handtmann | H03H 9/706 |
| | | | 375/220 |
| 2017/0207836 A1* | 7/2017 | Moon | H04B 7/0413 |
| 2017/0251474 A1* | 8/2017 | Khlat | H04B 1/18 |
| 2017/0315860 A1* | 11/2017 | Shin | G06F 11/0796 |
| 2018/0131435 A1* | 5/2018 | Atkinson | H03F 1/56 |
| 2019/0028136 A1* | 1/2019 | Zhang | H01Q 5/50 |

FOREIGN PATENT DOCUMENTS

| | | |
|---|---|---|
| KR | 10-2000-0007967 A | 2/2000 |
| KR | 10-2003-0008625 A | 1/2003 |
| KR | 10-2005-0040314 A | 5/2005 |
| KR | 10-0552195 B1 | 2/2006 |
| KR | 10-2006-0096683 A | 9/2006 |
| KR | 10-0758309 B1 | 9/2007 |
| KR | 10-2009-0122972 A | 12/2009 |
| KR | 10-1744877 B1 | 6/2017 |

* cited by examiner

ELECTRONIC DEVICE FOR DETERMINING FAILURE OF SIGNAL PATH AND COMPONENT, AND METHOD FOR OPERATING SAME

TECHNICAL FIELD

Various embodiments of the disclosure relate to an electronic device for determining failure of a signal path and a component and a method for operating the electronic device.

BACKGROUND ART

Currently, a variety of electronic devices including smart phones, tablet personal computers (PCs), portable multimedia players (PMPs), personal digital assistants (PDAs), laptop personal computers (PCs), and wearable devices have become prevalent.

These various electronic devices require communication circuits to carry out communication, and when an electronic device is produced, it is necessary to detect any failure in the communication circuit before shipping the product.

DISCLOSURE OF INVENTION

Technical Problem

Detection of failure or not of a communication circuit included in an electronic device may be carried out in a process to finish assembling of the electronic device. In order to detect any failure of the communication circuit, separate external measuring equipment may be used.

An electronic device whose assembling is finished is connected to external measuring equipment, and according to control of the external measuring equipment, the electronic device may test transmission/reception of a signal and determine failure of the communication circuit based on the test result.

However, where the communication circuit is defective, this may cause a problem such that the communication circuit should be separated from the electronic device whose assembling has been finished, for repair of the communication circuit. As separation of the communication circuit may require assembling and disassembling, a problem of lowering efficiency in the manufacturing process may arise.

After assembling and shipment of the electronic device, in order to detect failure of the communication circuit of the electronic device used by a user, there may be a problem that a repair center for the electronic device requires external measuring equipment. Further, the external measuring equipment is expensive and a problem of increasing production cost in the manufacturing process may be caused.

Solution to Problem

In accordance with an aspect of the disclosure, an electronic device may include: at least one connector configured to be connected to an external device; a first signal path including an amplifier configured to amplify a signal to be transmitted to the outside of the electronic device; a second signal path configured to obtain another signal from the outside of the electronic device; an antenna port electrically connected to the first signal path and the second signal path via a filter circuit; and a communication module, wherein the communication module is configured to: transmit a transmission signal to the antenna port via the first signal path; obtain at least part of the transmission signal via the second signal path; and determine failure of the electronic device based on the transmission signal and information associated with the at least part of the transmission signal.

In accordance with another aspect of the disclosure, an electronic device may include: at least one input terminal configured to be connected to an external device; and a processor, wherein the processor is configured to: transmit a control signal to the external device; receive information associated with at least part of the control signal transmitted to the input terminal from the external device; and detect failure of the external device based on the control signal and information associated with at least of the control signal.

In accordance with another aspect of the disclosure, an electronic device may include: at least one connector configured to be connected to an external device; a first signal path including an amplifier configured to amplify a signal to be transmitted to the outside of the electronic device; a second signal path configured to obtain another signal from the outside of the electronic device; a first antenna port electrically connected to the first signal path via a filter circuit; a second antenna port electrically connected to the second signal path; and a communication module, wherein the communication module is configured to: receive a control signal from an external device; transmit a transmission signal corresponding to the control signal to the first antenna port via the first path signal; emit the transmission signal using a first antenna connected to the first antenna port; receive the emitted signal using a second antenna connected to the second antenna port; obtain at least part of the transmission signal via the second signal path; and determine failure of the electronic device based on the transmission signal and information associated with the at least part of the transmission signal.

In accordance with another aspect of the disclosure, an electronic device may include: at least one connector configured to be connected to an external device; a first signal path including an amplifier configured to amplify a signal to be transmitted to the outside of the electronic device; a second signal path configured to obtain another signal from the outside of the electronic device; an antenna port electrically connected to the first signal path and the second signal path via a filter circuit; an antenna connected to the antenna port; a coupler connected to the antenna, generating a first signal coupled with a transmission signal transmitted to the antenna and a second signal coupled with a signal reflected from the antenna; and a communication module, wherein the communication module is configured to: receive a control signal from the external device; transmit a transmission signal corresponding to the control signal to the antenna port via the first signal path; control the antenna so as to emit the transmission signal; obtain the first signal and the second signal via the second signal path; and determine failure of the electronic device based on information associated with the first signal and information associated with the second signal.

Advantageous Effects of Invention

An electronic device for determining failure of a signal path and a component and a method for operating an electronic device according to various embodiments of the disclosure enable failure of a communication circuit to be detected without separate external measuring equipment, thereby serving to reduce the expense required for failure detection.

An electronic device for determining failure of signal path and component and a method for operating the electronic device according to various embodiments of the disclosure enable failure of a communication circuit to be detected before the communication circuit is assembled in the electronic device, thereby increasing production efficiency of the electronic device.

MODE FOR THE INVENTION

Figure 1:
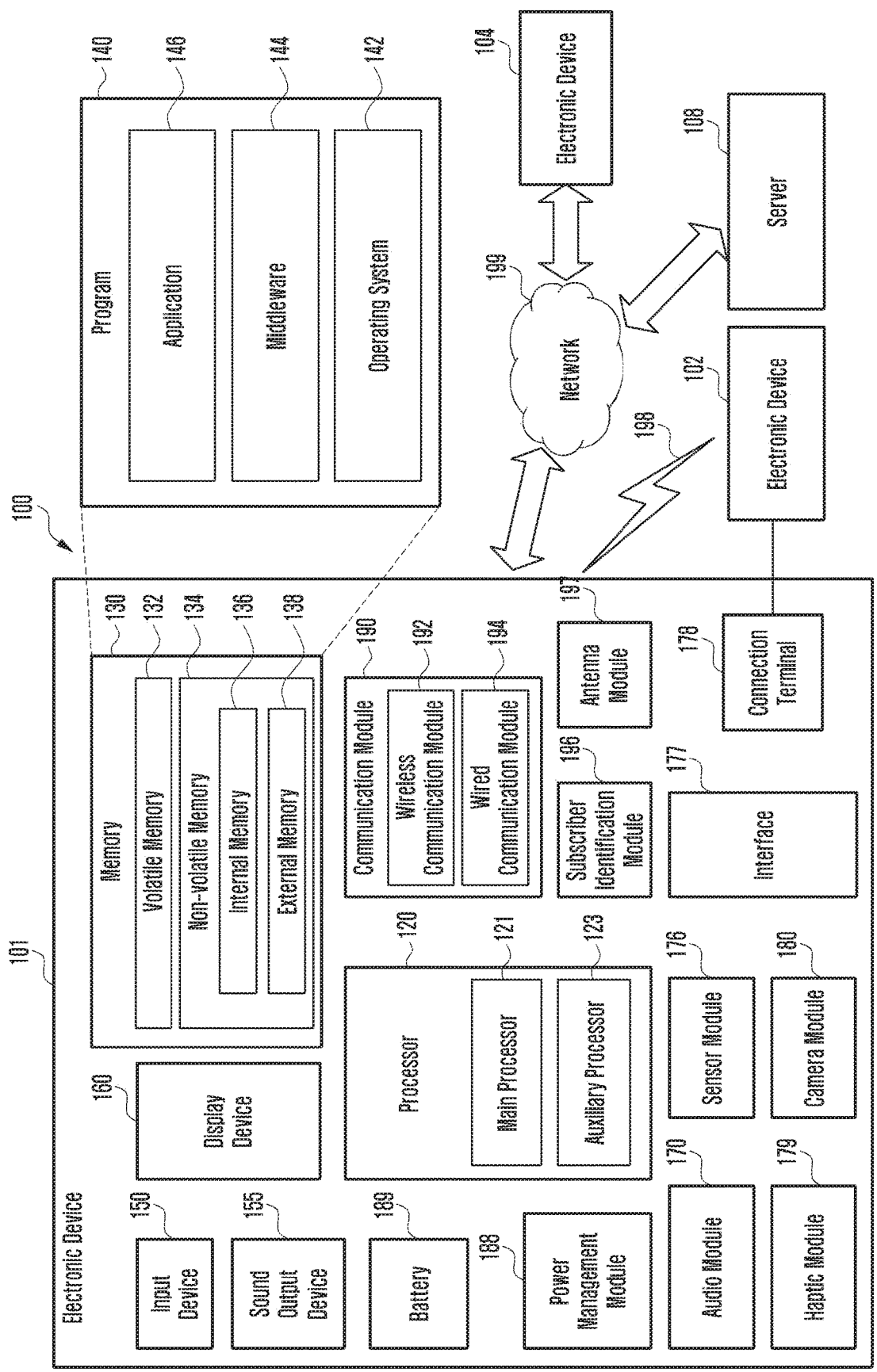
FIG. 1 is a block diagram illustrating an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be configured to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry configured to detect a touch, or sensor circuitry (e.g., a pressure sensor) configured to measure the intensity of force incurred by the touch.

The audio module 170 may convert a sound into an electrical signal and vice versa. According to an embodiment, the audio module 170 may obtain the sound through the input device 150, or output the sound through the sound output device 155 or a speaker or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user through the user's tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device through a first network 198 (e.g., a short-range communication network, such as Bluetooth™, wireless-fidelity (Wi-Fi) direct, or infrared data association (IrDA)) or a second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type from, the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
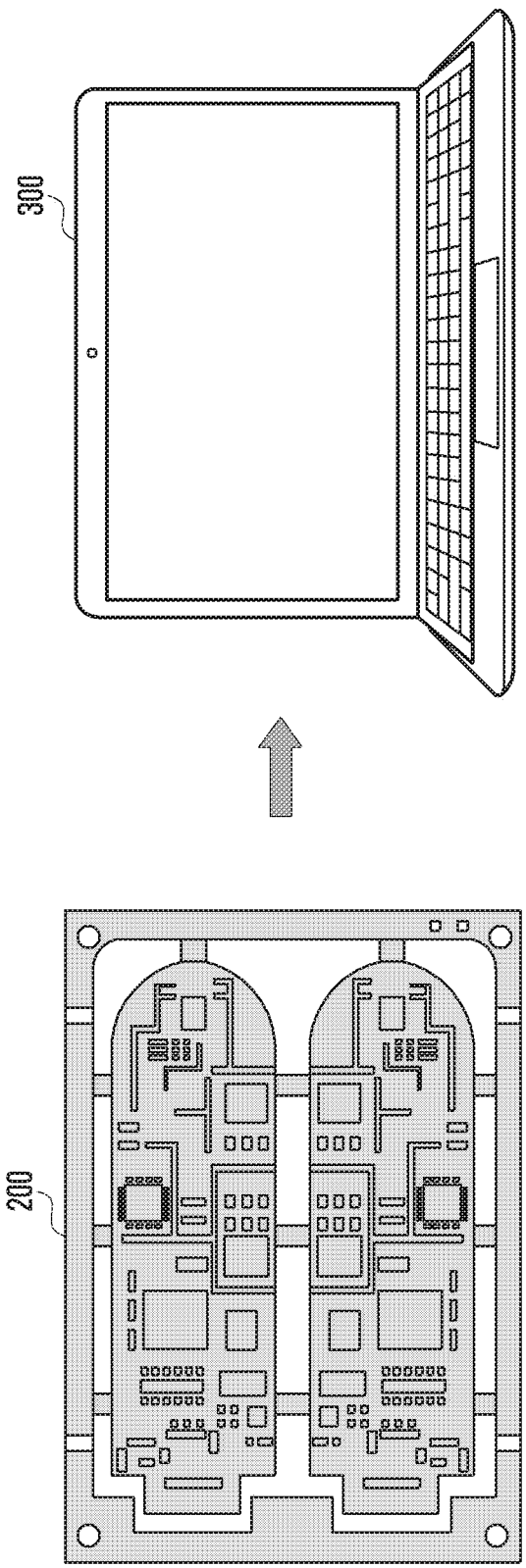
FIG. 2 is a view illustrating an electronic device and an inspection device configured to inspect failure of the electronic device according to various embodiments of the disclosure.

FIG. 2 is a view illustrating an electronic device and an inspection device configured to inspect failure of the electronic device according to various embodiments of the disclosure.

Referring to FIG. 2, an electronic device 200 and an inspection device 300 configured to inspect failure of the electronic device 200 are illustrated therein.

The electronic device 200 may be a printed circuit board (PCB) embedding therein communication related parts included in various electronic devices (e.g., the electronic device 101 of FIG. 1) performing communication, such as portable terminals. According to various embodiments of the disclosure, the electronic device 200 may be connected to the inspection device 300 in a state (an opened state) that no antenna is connected to an antenna port included in the PCB and inspect failure of the electronic device 200 based on control signals of the inspection device (300). According to various embodiments of the disclosure, failure of various components (e.g., an amplifier, a signal path, etc. used in transmission of RF signals) used in communication of the electronic device 200 may be detected.

The inspection device 300 may inspect failure of the electronic device 200. According to various embodiments of the disclosure, the inspection device 300 may have at least one connector, for connection to the electronic device 200. The inspection device 300 may be connected to the electronic device 200 using at least one wiring and may detect failure of various components (e.g., an amplifier, a signal path, etc. used in transmission of RF signals) used in communication of the electronic device 200.

According to various embodiments of the disclosure, the electronic device 200 may detect failure of various components used in communication, without using the inspection device 300. Specific contents of the above embodiments will be described in connection with FIGS. 9A and 9B.

Figure 3:
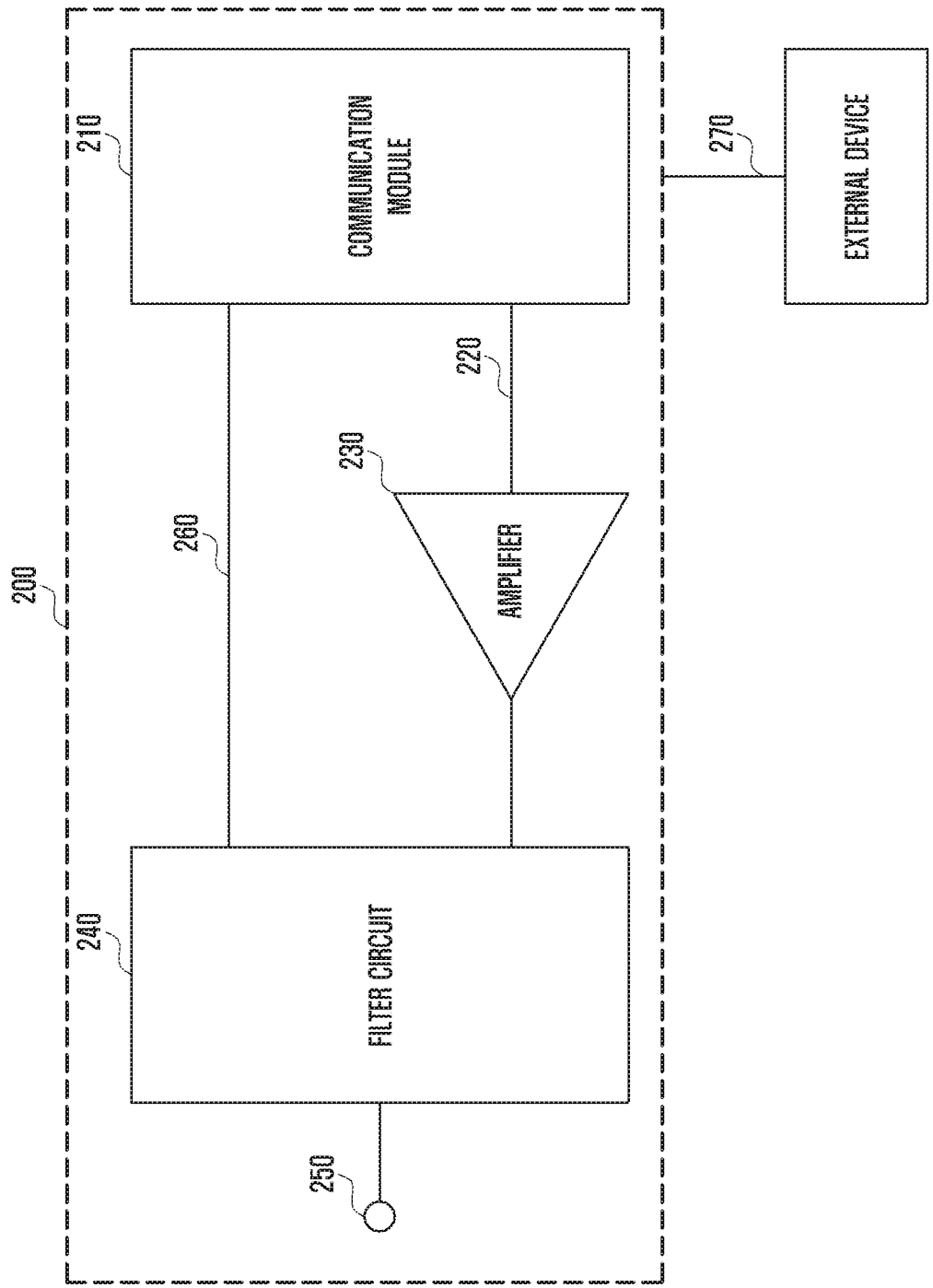
FIG. 3 is a block diagram illustrating an electronic device according to various embodiments of the disclosure.

FIG. 3 is a block diagram illustrating an electronic device according to various embodiments of the disclosure.

Referring to FIG. 3, the electronic device 200 according to various embodiments of the disclosure may include a communication module 210, a first signal path 220, an amplifier 230, a filter circuit 240, an antenna port 250, a second signal path 260, and at least one connector 270.

According to various embodiments of the disclosure, the electronic device 200 may have at least one connector 270, for connection to an external device (e.g., the inspection device 300 of FIG. 2). The external device 300 may transmit control signals to detect failure of various components included in the electronic device 200 via at least one connector 270.

According to various embodiments of the disclosure, the first signal path 220 may connect the communication module 210 and the filter circuit 240 and may be a path via which the signal transmitted by the communication module 220 is transmitted to the filter circuit 240. The first signal path 220 may include the amplifier 230 configured to amplify the signal transmitted by the communication module 210. Various forms of the amplifier 230 may be used, and the amplifier 230 may be implemented as a power amplifier, but there is no limitation thereto.

According to various embodiments of the disclosure, the second signal path 220 may connect the communication module 210 and the filter circuitry 240 and may be a path via which a signal received by an antenna (not shown) connected to the antenna port 250 is transmitted to the communication module 210. Referring to FIG. 3, the antenna is in a state (an opened state) of being not connected to the antenna port 250. The signal transmitted by the communication module 210 may be transmitted to the filter circuit 240. A leaked signal partially leaked out from a signal transmitted by the communication module 210 may be transmitted to the communication module 210 via the second signal path 260.

According to various embodiments of the disclosure, where the antenna is in a state of being connected to the antenna port 250, the leaked signal partially leaked out from a signal transmitted by the communication module 210 may be transmitted to the communication module 210 via the second signal path 260.

According to various embodiments of the disclosure, the filter circuit 240 may filter and transmit a signal transmitted from the communication module 210 to the antenna port 250, and the filter circuit 240 may filter and transmit the signal received by an antenna (not shown) connectable to the antenna port 250 to the communication module 210 via the second signal path 260.

According to various embodiments of the disclosure, the filter circuit 240 may be implemented differently according to the communication scheme. Where the electronic device 200 supports communication using frequency division duplex (FDD) in which a transmission frequency and a reception frequency are different from each other (e.g., the communication may include all the various communication schemes such as LTE-FDD, etc.), the filter circuit 240 may be implemented by use of a duplexer. The duplexer may filter a signal corresponding to the transmission frequency and a signal corresponding to the reception frequency. Where the electronic device 200 supports communication using time division duplex (TDD) (e.g., the communication may include all the various communication schemes such as LTE-TDD), the filter circuit 240 may be implemented in addition of at least two switch circuits. In this case, a switch circuit may connect the first signal path 220 and the filter circuit 240, and another switch circuit may connect the second signal path 260 and the filter circuit 240. The switch circuit may perform switching using a time corresponding to transmission and a time corresponding to reception. According to various embodiments of the disclosure, where the electronic device 200 supports communication in multiple frequency bands, the filter circuit 240 may be implemented as a plurality of duplexers or switches according to the frequency bands that may be supported.

According to various embodiments, where the electronic device 200 supports a plurality of frequency bands or a variety of technologies such as multi input multi output (MIMO), diversity, or beamforming, etc., which are available for using a plurality of antennas, the electronic device 200 may have a plurality of antenna ports 250 therein. FIG. 3 is described below under the assumption that there is one antenna port 250, for the convenience of description.

According to various embodiments of the disclosure, the communication module 210 may perform various controls for communication of the electronic device 200. For example, the communication module 210 may receive data or a control signal for data transmission from the processor 120 of a portable terminal (e.g., the electronic device 101 of FIG. 1) and perform data transmission/reception. Where an antenna is connected to the electronic device 200, a signal may be emitted using the antenna.

According to various embodiments of the disclosure, the communication module 210 may receive a control signal from an external device (e.g., the inspection device 300 of FIG. 2). The control signal may be a control signal to inspect failure of various components or paths included in the electronic device 200. The communication module 210 may receive the control signal from the external device 300 and transmit a transmission signal corresponding to the control signal to the antenna port 250 via the first signal path 220.

According to various embodiments of the disclosure, part of the transmission signal may be leaked to the second signal path 260. The communication module 210 may obtain at least part of the transmission signal which is partially leaked out via the second signal path 260. The communication module 210 may transmit the transmission signal and information associated with at least part of the transmission signal to the external device 300 via at least one wiring 270.

According to various embodiments of the disclosure, where the electronic device 200 supports communication using frequency division duplex (FDD) in which a transmission frequency and a reception frequency are different from each other (e.g., the communication may include all the various communication schemes such as LTE-FDD, etc.), the communication module 210 may use a transmission signal having a same frequency as the transmission frequency. As another example, the communication module 210 may use a transmission signal having a same frequency as the reception frequency.

The external device 300 may determine failure of the components or signal paths included in the electronic device 200, using the transmission signal transmitted by the electronic device 200 and information associated with at least part of the transmission signal.

According to various embodiments of the disclosure, the information associated with at least part of the transmission signal may include information for attenuated amplitude of the transmission signal while the transmission signal is transmitted via the first signal path 220 and the second signal path 260.

The attenuated amplitude of the transmission signal corresponding to a case where the components or signal paths included in the electronic device 200 are defective, may be large compared to the attenuated amplitude of the transmission signal corresponding to a case where the components or signal paths included in the electronic device 200 are normal. According to various embodiments of the disclosure, failure of the electronic device 200 may be determined based on the attenuated amplitude of the transmission signal.

For example, where an amplifier included in the electronic device 200 is defective, the amplification degree of the transmission signal may be low or the transmission signal may not be amplified. In this case, the attenuated amplitude of the transmission signal may be larger compared to the attenuated amplitude of the transmission signal corresponding to a case where the amplifier is normal.

As another example, where a signal path (the first signal path 220 or the second signal path 260) included in the electronic device 200 is defective, the transmission signal may not be transmitted, or the amplitude of the transmission may be low. In this case, the attenuated amplitude of the transmission signal may be larger compared to the attenuated amplitude of the transmission signal corresponding to a case where the signal path is normal.

Besides, a variety of defective cases may be detected, which will be described below in connection with FIG. 5 to FIG. 9B.

According to various embodiments of the disclosure, in the production process of the electronic device 101, failure of the components or signal paths included in the electronic device 200 may be determined before the electronic device 202 is installed, or in a state that an antenna (not shown) is not mounted in the antenna port 250 of the electronic device 200, thereby increasing the production efficiency.

Figure 4:
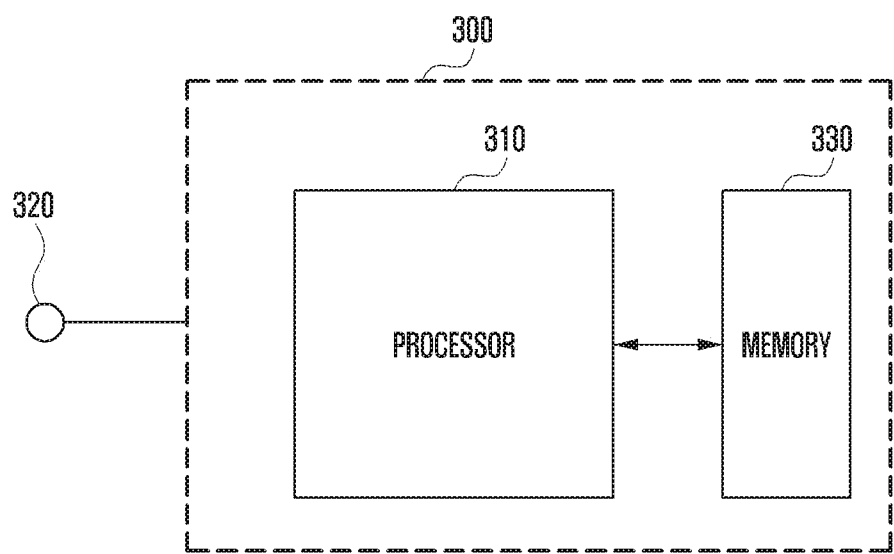
FIG. 4 is a block diagram illustrating an inspection device according to various embodiments of the disclosure.

FIG. 4 is a block diagram illustrating an inspection device according to various embodiments of the disclosure.

Referring to FIG. 4, an inspection device (e.g., the inspection device 300 of FIG. 2) may include at least one connector 320, a processor 310, and a memory 330.

According to various embodiments of the disclosure, at least one connector 320 is connected to an external device (e.g., the electronic device 200 of FIG. 2) and may receive various information transmitted by the external device.

According to various embodiments of the disclosure, the processor 310 may transmit a control signal to the external device 200. The control signal may be a signal to control an operation to detect failure of the various components or signal paths included in the external device 200.

The processor 310 may receive information associated with at least part of the control signal transmitted from the external device 200 via the connector 320.

According to various embodiments of the disclosure, the inspection device 300 may include the memory 330 storing therein information to determine failure of the external device 200 transitorily or non-transitorily.

As described above in connection with FIG. 3, in a state that an antenna terminal (e.g., the antenna terminal 250 of FIG. 3) of the external device 200 is opened, the external device 300 may transmit a transmission signal corresponding to the control signal to the antenna terminal 250 via a first signal path (e.g., the first signal path 220 of FIG. 2). The transmission signal transmitted to the antenna terminal 250 may be partially leaked out and the leaked signal may be transmitted to a communication module (e.g., the communication module 210 of FIG. 3) of the external device 200. The external device 200 may transmit to the inspection device 300 information associated with at least part of the control signal including therein information associated with part of the transmission signal transmitted to the communication module.

The processor 310 may determine failure of the external device 200 based on the information associated with at least part of the control signal. The processor 310 may determine failure of the signal paths or various components included in the external device 200.

According to various embodiments of the disclosure, the information associated with at least part of the control signal may include a degree of amplitude attenuation of the transmission signal transmitted via a signal path included in the external device 200, and the processor 310 may determine failure of the external device 200 based on the degree of amplitude attenuation of the signal.

According to various embodiments of the disclosure, the memory 330 may store therein information (e.g., may be implemented as a table in which the degree of amplitude attenuation of the signal is mapped with failure of the external device 200, but no limitation is applied to the table form) used in determining failure of the electronic device 200 according to the degree of amplitude attenuation of the signal. The processor 310 may identify the degree of amplitude attenuation of the signal and determine failure of the external device 200 according to the degree of amplitude attenuation of the signal, using the table stored in the memory 330. For example, a table in which the external device 200 is determined to be defective where the degree of amplitude attenuation of the signal is equal to or larger than (or exceeds) the predetermined value may be stored in the memory 330.

The attenuated amplitude of a transmission signal corresponding to a case where the components or signal paths included in the external device 200 are defective may be large compared to the attenuated amplitude of the transmission signal corresponding to a case where the components or signal paths included in the electronic device 200 are normal. According to various embodiments of the disclosure, the processor 310 may determine failure of the external device 200 based on the attenuated amplitude of the transmission signal.

For example, where an amplifier included in the external device 200 is defective, the amplification degree of the transmission signal may be low or the transmission signal may not be amplified. In this case, the attenuated amplitude of the transmission signal may be larger than the attenuated amplitude of the transmission signal corresponding to a case where the amplifier is normal. The processor 310 may determine that the amplifier included in the external device 200 is defective if the attenuation degree of the transmission signal exceeds the predetermined value (or at least part of the transmission signal has an amplitude equal to or less than the predetermined value).

As another example, when a signal path (the first signal path 220 or the second signal path 260) included in the external device 200 is defective, the transmission signal may not be transmitted, or the amplitude of the transmission may be low. In this case, the attenuated amplitude of the transmission signal may be larger compared to the attenuated amplitude of the transmission signal corresponding to a case where the signal path is normal. The processor 310 may determine that a signal path (the first signal path 220 or the second signal path 260) included in the external device 200 is defective if the attenuation degree of the transmission signal exceeds the predetermined value (or at least part of the transmission signal has an amplitude equal to or less than the predetermined value).

According to various embodiments of the disclosure, the information associated with at least part of a control signal may include amplitudes of the signals measured respectively by a plurality of paths included in the communication module 210 of the external device 200. The processor 310 may determine whether there is any defective signal path among the plurality of signal paths, based on the amplitudes of the signals measured respectively by the plurality of paths. Where the amplitude of a signal measured in one or more signal paths, among the amplitudes of the signals measured respectively by the plurality of paths, is lower than the predetermined value, the processor 310 may determine that the signal path corresponding to the amplitude of the signal lower than the predetermined value is defective. The processor 310 may identify the amplitudes of the signals measured respectively by the plurality of paths and determine that a component (e.g., an amplifier) connected to the plurality of signal paths in common is defective where the number of signal paths corresponding to the amplitude of the signal lower than the predetermined value is equal to or larger than the predetermined value. This content will be described below in detail in connection with FIGS. 6A and 6B.

According to various embodiments of the disclosure, the predetermined values may be stored in the memory 330. After reading a predetermined value in the memory 330, the processor 310 may compare the attenuated amplitude of the transmission signal with the predetermined value. Based on the comparison result, the processor 310 may determine failure of the electronic device 200.

In the production process of an electronic device 101, the inspection device 300 according to various embodiments of the disclosure may determine failure of the components or signal paths included in the electronic device 200 before the electronic device 200 is installed in the electronic device 101 or in a state that an antenna (not shown) is not mounted in an antenna port 250 of the electronic device 200, thereby increasing the production efficiency. Also, where the electronic device 200 is defective, it may be determined which component or which signal path of the electronic device 200 is defective.

FIGS. 5 to 9B are views showing various embodiments to determine failure of the electronic device illustrated in FIG. 3.

Figure 5:
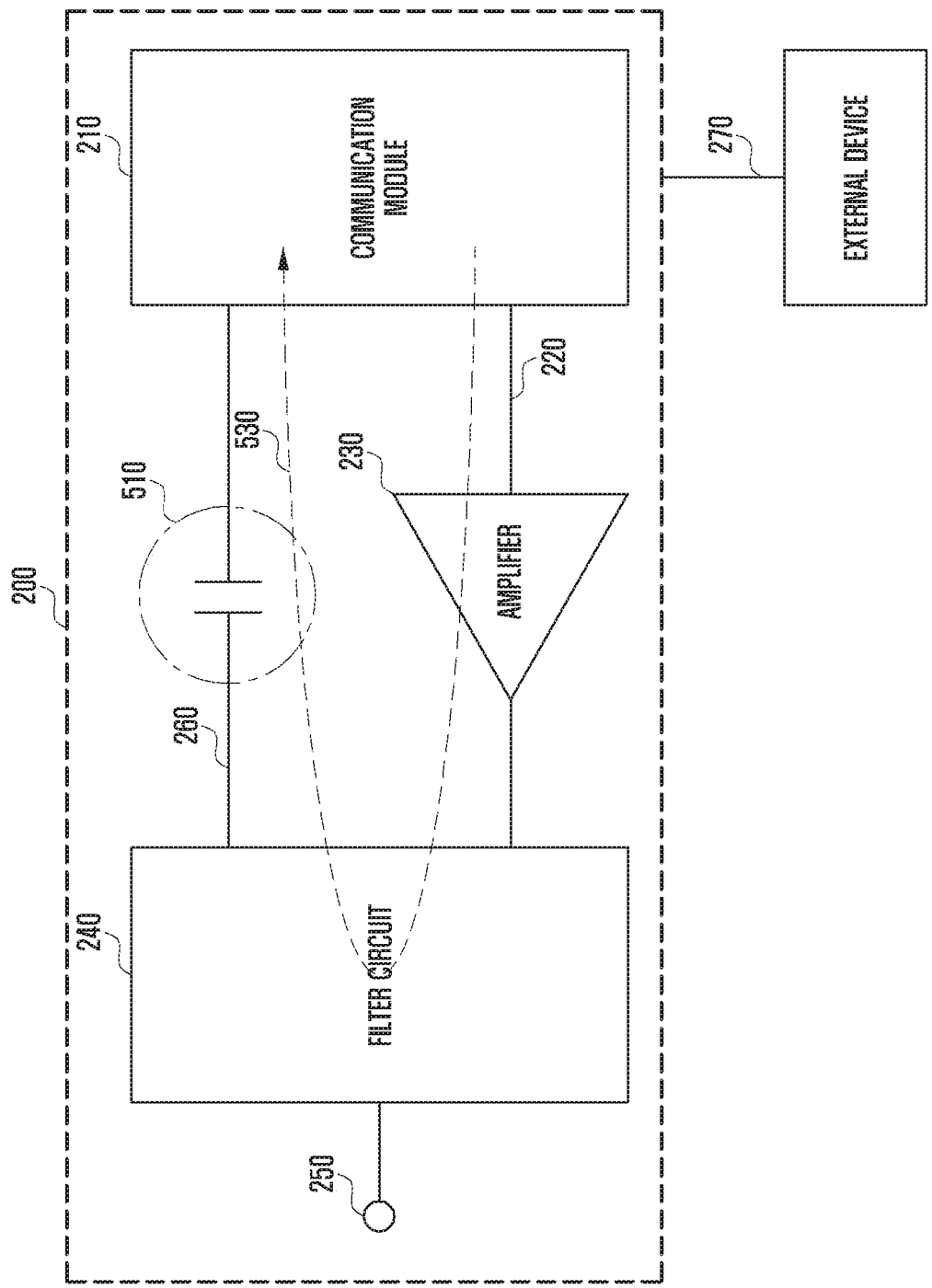
FIGS. 5 to 9B are views illustrating various embodiments of the disclosure to determine failure of the electronic device illustrated in FIG. 3.

FIG. 5 shows the block diagram of an electronic device illustrated in FIG. 3 (e.g., the electronic device 200 of FIG. 3).

The electronic device 200 according to various embodiments of the disclosure may include the communication module 210, the first signal path 220, the amplifier 230, the filter circuit 240, the antenna port 250, and the second signal path 260. Description of configurations duplicate with those of the electronic device illustrated in FIG. 3 will be omitted below.

Referring to FIG. 5, the communication module 210 may receive a control signal of an external device (e.g., the inspection device 300 of FIG. 2) and transmit a transmission signal 520 corresponding to the control signal to the antenna port 250 via the first signal path 220.

According to various embodiments of the disclosure, the transmission signal 520 transmitted to the antenna part 250 may be partially leaked out. Referring to FIG. 5, a part 530 of the leaked transmission signal which is partially leaked out from the transmission signal 520 is illustrated therein.

According to various components of the disclosure, the communication module 210 may obtain a part 530 of the transmission signal via the second signal path 260 and transmit the part 530 of the transmission signal to the external device 300. As described above in connection with FIG. 4, the external device 300 may determine failure of the electronic device 200 based on information for the part 530 of the transmission signal received from the electronic device 200.

FIG. 5 illustrates a state in which a part 510 of the second signal path 260 is defective (an opened state in which the part 510 is cut). Where the part 510 of the second signal path 260 is defective, the part 530 of the transmission signal may not be transmitted or may be transmitted to the communication module 210 in a state that the amplitude thereof is small compared to the normal state.

The inspection device 300 according to various embodiments of the disclosure may identify that the amplitude of the part 530 of the transmission signal is lower than the predetermined value and determine that the electronic device 200 is defective.

Figure 6A:
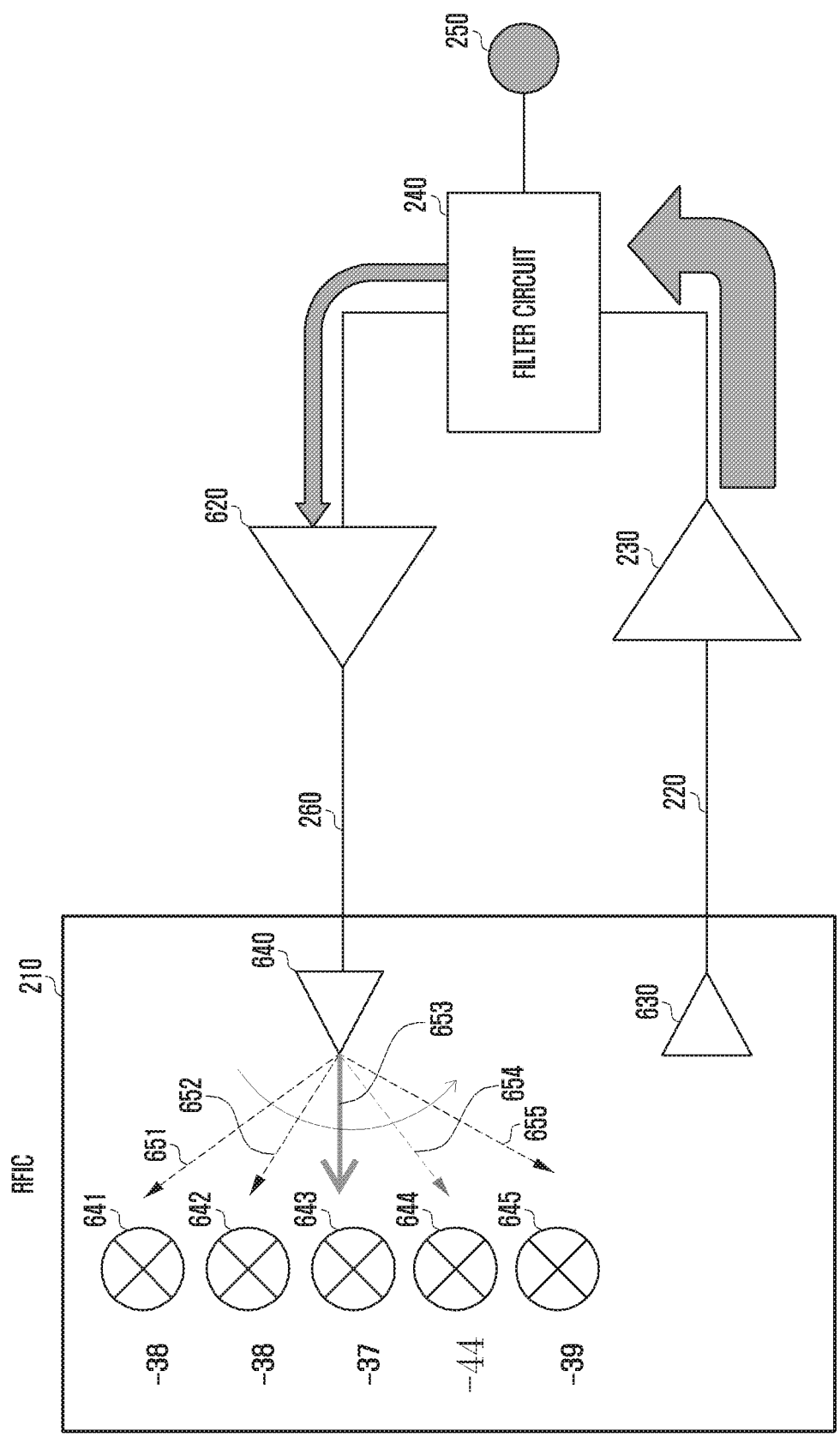
Figure 6B:
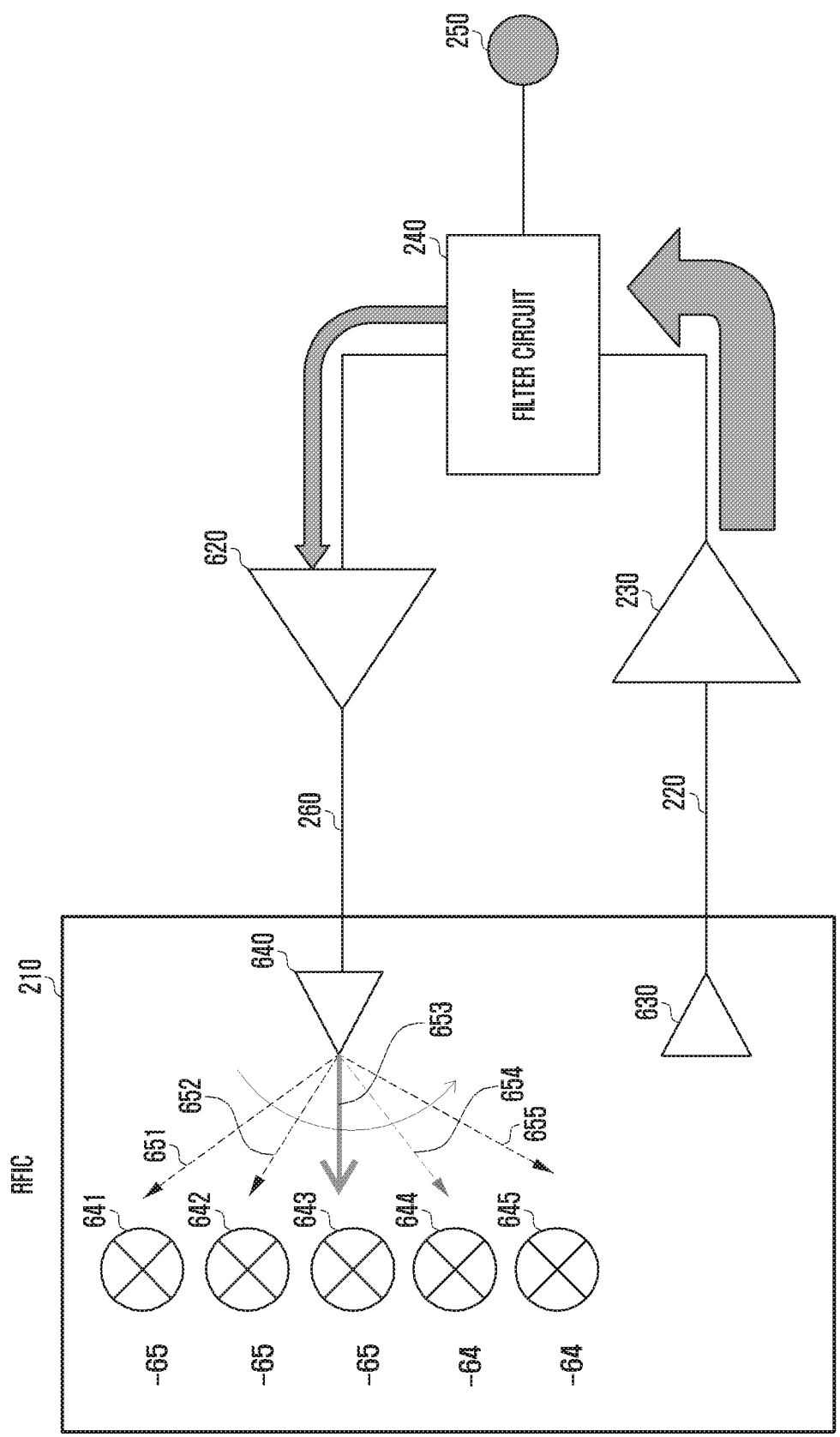

FIGS. 6A and 6B show block diagrams of the electronic device shown in FIG. 3 (e.g., the electronic device 200 of FIG. 3).

The electronic device 200 according to various embodiments of the disclosure may include the communication module 210, the first signal path 220, the amplifier 230, the filter circuit 240, the antenna port 250, and the second signal path 260. Description of configurations duplicate with those of the electronic device illustrated in FIG. 3 will be omitted below.

According to various embodiments of the disclosure, the communication module 210 may include a first amplifier 630 connected to the first signal path 220, a second amplifier 640 connected to the second signal path 260, a plurality of mixers 641, 642, 643, 644 and 645, and a plurality of signal paths 651, 652, 653, 654 and 655 connecting each of the plurality of mixers and the amplifier 640.

The first amplifier 630 may amplify a signal based on a control signal and transmit a transmission signal to the first signal path 220.

The second amplifier 640 may amplify the transmission signal transmitted via the second signal path 260.

The plurality of mixers 641, 642, 643, 644 and 645 may perform frequency transmission for the transmission signal amplified by the amplifier 640. The plurality of mixers 641, 642, 643, 644 and 645 may perform frequency transmission (e.g., down-conversion to lower a frequency band or up-conversion to enhance a frequency band) for the transmission signal.

FIG. 6A illustrates a state in which the communication module 210 is defective. In particular, FIG. 6A illustrates that among the plurality of signal paths 651, 652, 653, 654 and 655 included in the communication module 210, one signal path 653 is defective.

The inspection device 300 according to various embodiments of the disclosure may identify amplitudes of transmission signals measured by the mixers 641, 642, 643, 644 and 645 respectively connected to the plurality of signal paths 651, 652, 653, 654 and 655. The inspection device 300 may identify the amplitudes of the signals measured by the respective mixers and identify the signal path 653 corresponding to the mixer 643 having a transmission signal whose amplitude is lower than the predetermined value. The inspection device 300 may determine that the signal path 653 is defective.

FIG. 6B illustrates a state in which the communication module 210 is defective. In particular, FIG. 6B illustrates a state in which the amplifier 640 included in the communication module 210 is defective.

The inspection device 300 according to various embodiments of the disclosure may identify amplitudes of the transmission signals measured by the mixers 641, 642, 643, 644 and 645 respectively connected to the plurality of signal paths 651, 652, 653, 654 and 655. The inspection device 300 may identify the amplitudes of the transmission signals measured by the respective mixers and identify the signal paths 651, 652, 653, 653 and 655 corresponding to the mixers 641, 641, 643, 644 and 645 in which the amplitude of the transmission signal is smaller than the predetermined value. In this case, as the amplitudes of the signals measured by all the signal paths 651, 652, 653, 654 and 655 are lower than the predetermined value, the inspection device 300 may determine that the amplifier 640 connected to all the signal paths 651, 652, 653, 654 and 655 in common is defective.

According to various embodiments of the disclosure, the amplifier 640 may support various modes (a high gain mode, a middle gain mode and a low gain mode). The inspection device 300 may identify the amplitude of a transmission signal corresponding to each of the various modes that the amplifier 640 can support and, by use thereof, determine failure of the amplifier 640.

Figure 7:
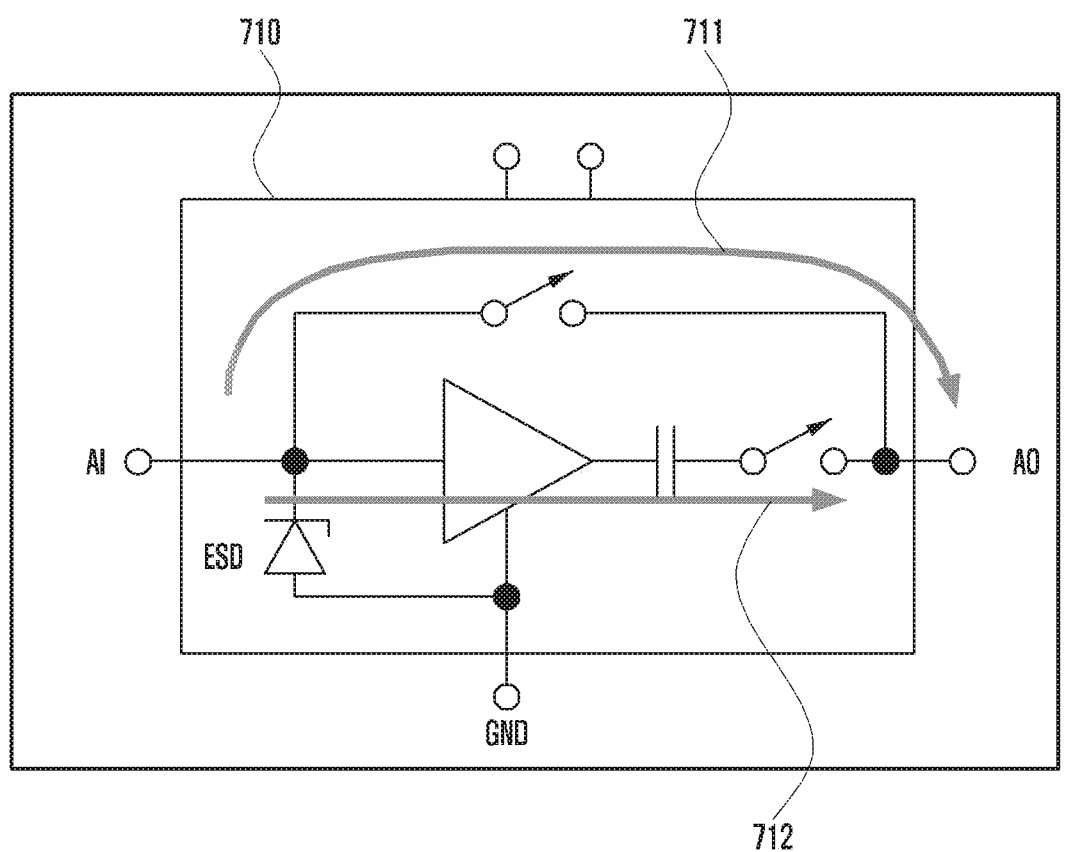

FIG. 7 is a view illustrating an amplifier included in the electronic device 200 according to various embodiments of the disclosure.

The amplifier 710 connected to the communication module 210 may support an amplification mode in which a signal input via an input terminal is amplified and transmitted to an output terminal. According to various embodiments of the disclosure, the amplifier 710 may support a bypass mode. The bypass mode may be a mode in which a signal input to the amplifier 710 is transmitted, without being amplified, to the output terminal as it is.

FIG. 7 shows a flow 711 of the signal in a bypass mode state and a flow 712 of the signal in an amplification mode state.

According to various embodiments of the disclosure, where the amplifier 710 normally supports amplification of a signal, the amplitude of the signal corresponding to the amplification mode state and the amplitude of the signal corresponding to the bypass mode state may be different, and the difference may be higher than or as much as the predetermined value (e.g., a value multiplied by a gain value of the amplifier in the amplitude of the input signal, which is then multiplied by a constant). Where the amplifier 710 is defective, the amplitude of the signal corresponding to the amplification mode state and the amplitude of the signal corresponding to the bypass mode state may be equal to or less than the predetermined value.

The inspection device 300 according to various embodiments of the disclosure may receive from the electronic device 200 information associated with at least part of a transmission signal. The information associated with at least part of the transmission signal may include the amplitude of at least part of the transmission signal in a state that the amplifier 710 is controlled to be operated in the amplification mode and the amplitude of at least part of the transmission signal in a state that the amplifier 710 is controlled to be operated in the bypass mode.

The inspection device 300 according to various embodiments of the disclosure may identify any difference between the amplitude of at least part of the transmission signal in a state that the amplifier 710 is controlled to be operated in the amplification mode and the amplitude of at least part of the transmission signal in a state that the amplifier 710 is controlled to be operated in the bypass mode. Where the difference is equal to or less than (or less than) the predetermined value, the inspection device 300 may determine that the amplifier 710 is defective.

Figure 8:
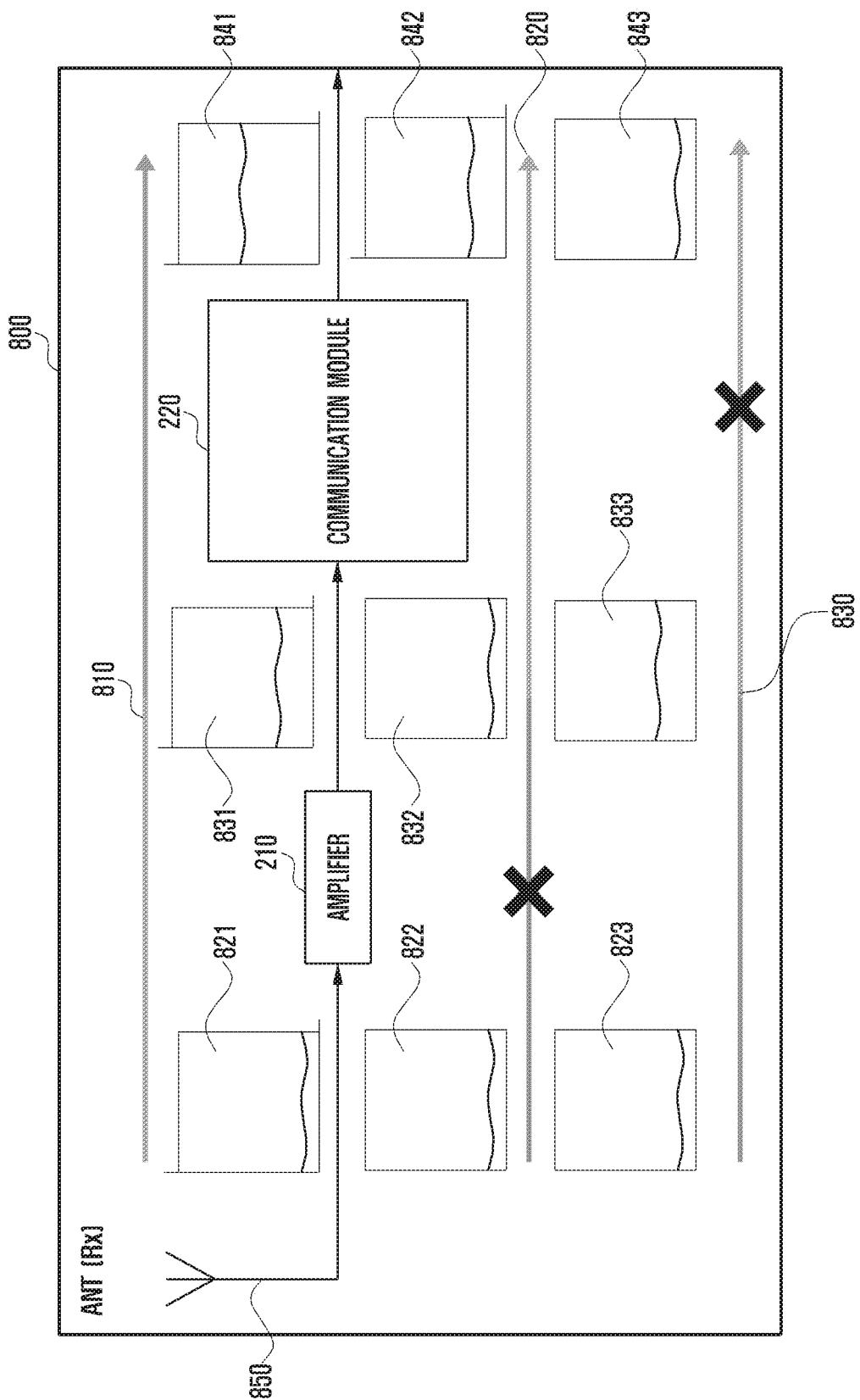

FIG. 8 is a view illustrating an electronic device according to various embodiments of the disclosures, showing a communication module 220 available for diversity reception.

Referring to FIG. 8, an electronic device 800 may include an antenna 850 for diversity reception and an amplifier 210 connecting a diversity antenna 850, and the communication module 220.

Diversity reception is directed to enhancing reception sensitivity and may support only a reception function.

According to various embodiments of the disclosure, it may be determined whether the electronic device 800 is defective or not, using white noise existing in the natural world.

According to various embodiments of the disclosure, the diversity antenna 850 may receive white noise and transmit the white noise to the communication module 220 via a plurality of signal paths 810, 820 and 830.

The communication module 220 may transmit to the external device 300 information associated with the amplitude of the signal of the received white noise.

According to various embodiments of the disclosure, the external device 300 may determine failure of the electronic device 800 based on the amplitude of the signal of the white noise.

Referring to FIG. 8, a signal path 810 to which white noise is transmitted when the electronic device 800 is normal, a signal path 820 to which white noise is transmitted when the amplifier 210 is defective, and a signal path to which white noise is transmitted when the transmission module 220 is defective are illustrated therein.

Where the electronic device 800 is normal, the white noise 821 may be amplified by the amplifier 210 (831) and transmitted to the communication module 220 (841).

Where the amplifier 210 of the electronic device 800 is defective, the white noise 822 may not be amplified by the amplifier 210 (832) and may be transmitted to the communication module 220 (842).

Where the communication module 220 of the electronic device 800 is defective, the white noise 823 is amplified by the amplifier (833), but may not be amplified by the communication module 220 although the white noise 823 is transmitted to the communication module 220 (843).

According to various embodiments of the disclosure, the electronic device 800 may have a memory therein storing information associated with the amplified amplitude (841) of the white noise when the electronic device 800 is normal. The electronic device 800 may identify the amplified amplitude of the white noise, and using the information stored in the memory, if the amplified amplitude of the white noise is equal to or larger than the predetermined value, it may be determined that the electronic device 800 is normal. Conversely, if the amplified amplitude of the white noise is equal to or less than the predetermined value, it may be determined that the electronic device 800 is defective.

Figure 9A:
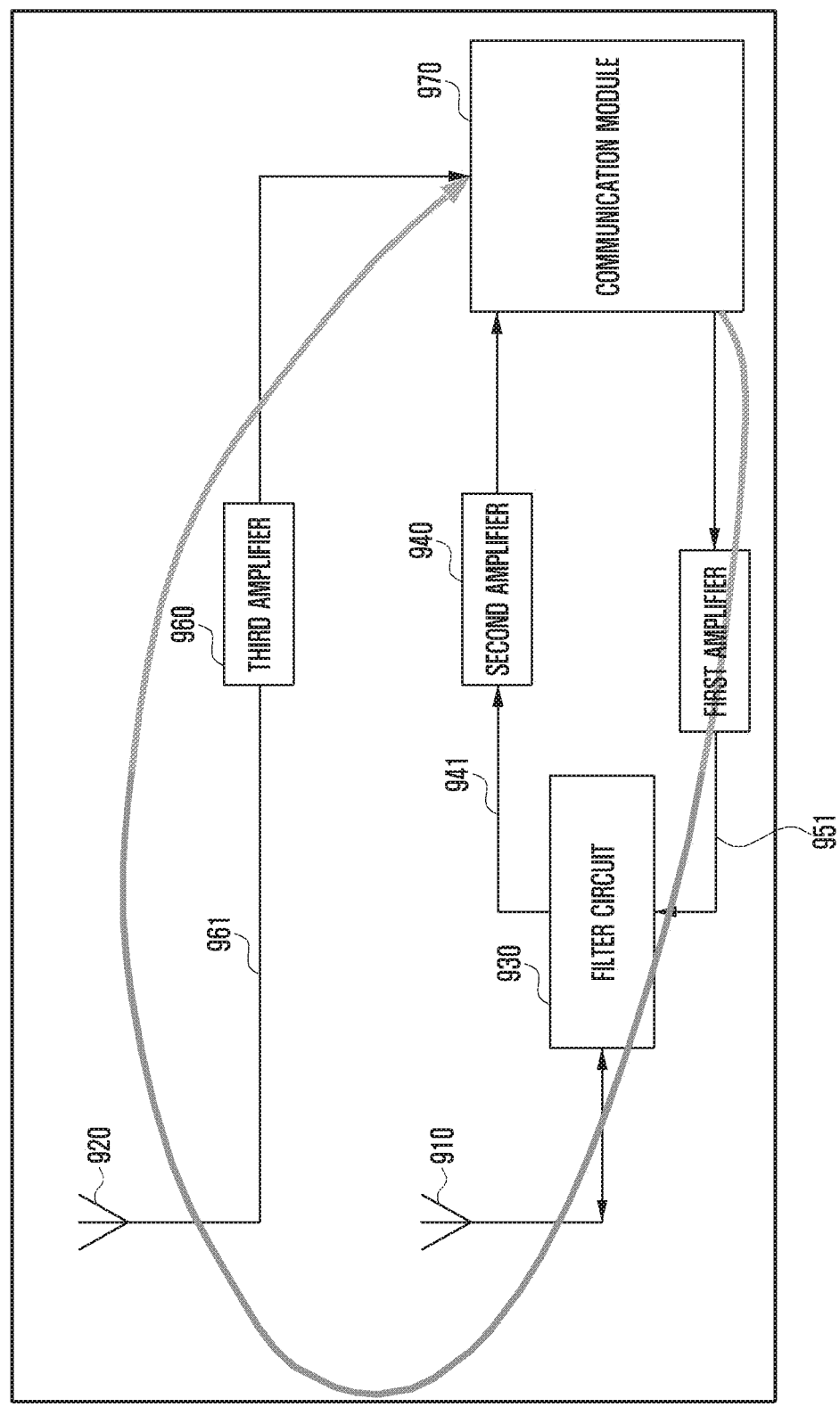
Figure 9B:
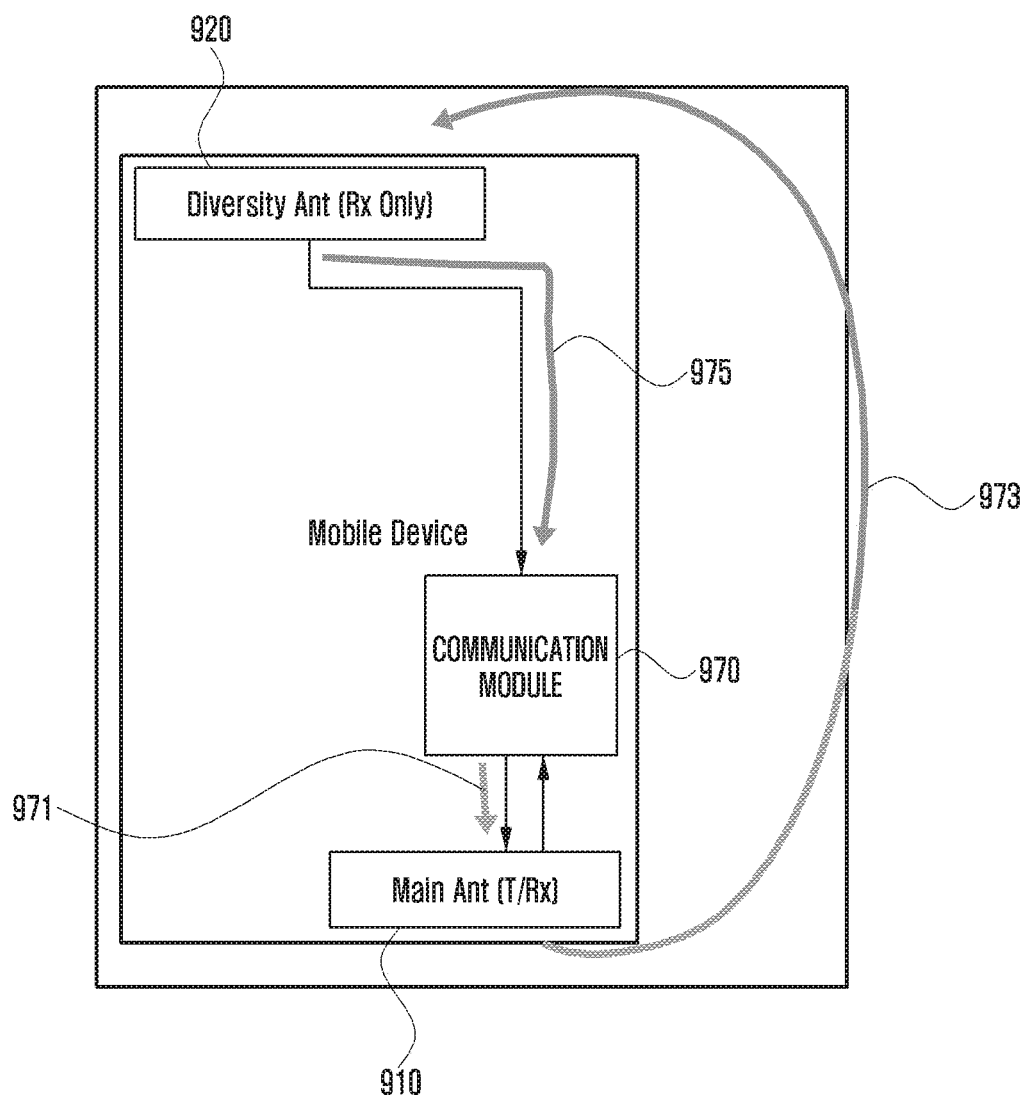

FIGS. 9A and 9B are views illustrating an electronic device according to another embodiment of the disclosure.

The illustrations of FIGS. 9A and 9B are to determine whether an antenna for diversity reception, a signal path connected to the antenna, and various components connected to the signal path are defective or not.

Referring to FIGS. 9A and 9B, an electronic device 900 may include a first antenna 910, a second antenna 920, a filter circuit 930, a first amplifier 950, a second amplifier 940, a third amplifier 960, a first signal path 941, a second signal path 951, a third signal path 961, and a communication module 970. Description of configurations duplicate with those of the electronic device illustrated in FIG. 3 will be omitted below.

According to various embodiments of the disclosure, the first antenna 910 may perform transmission/reception of a signal and the second antenna 920 may perform reception of a signal as an antenna for diversity reception.

According to various embodiments of the disclosure, the communication module 970 may receive a control signal from an external device (e.g., the inspection device 300 of FIG. 3) connected to the electronic device 900 and transmit a transmission signal corresponding to the control signal to the filter circuit 930 via the first signal path 951. The transmission signal may pass through the filter circuit 930 and may be emitted by the first antenna 910.

According to various embodiments of the disclosure, the second antenna 920 may receive the transmission signal emitted by the first antenna 910. The communication module 970 may obtain at least part of the transmission signal received by the second antenna 920 via the third signal path 961. The communication module 970 may transmit to the external device 300 information associated with at least part of the transmission signal received by the second antenna 920.

FIG. 9B is a view illustrating a forward direction of the signal illustrated in FIG. 9A. Referring to FIG. 9B, the communication module 970 may transmit a transmission signal to the first antenna via the first signal path 951 (971), and the first antenna 910 may emit the transmission signal. At least part of the emitted transmission signal may be received by the second antenna 920 (973). The at least part of the transmission signal received by the second antenna 920 may be transmitted to the communication module 970 (975).

According to various embodiments of the disclosure, the external device 300 may determine whether the second antenna 920, the third signal path 961, the third amplifier 960, and the communication module 970 are defective, based on the information associated with the at least part of the transmission signal.

According to various embodiments of the disclosure, the information associated with at least part of the transmission signal may include information on the attenuated amplitude of the transmission signal while the transmission signal is being transmitted via the first signal path 951 and the second signal path 961.

The attenuated amplitude of the transmission signal corresponding to a case where the components (e.g., the second antenna 920 and the third amplifier 960 or the signal paths (e.g., the third signal path 961)) included in the electronic device 900 are defective may be large compared to the attenuated amplitude of the transmission signal corresponding to a case where the components or the signal paths included in the electronic device 900 are normal. According to various embodiments of the disclosure, it may be determined whether the electronic device 900 is defective, based on the attenuated amplitude of the transmission signal.

For example, where the third amplifier 960 is defective, the amplification degree of the transmission signal may be low, or the transmission signal may not be amplified. In this case, the attenuated amplitude of the transmission signal may be larger than the attenuated amplitude of the transmission signal corresponding to a case where the third amplifier 960 is normal. The external device 300 may determine that the third amplifier 960 is defective where the attenuation degree of the transmission signal exceeds the predetermined value (or the amplitude of at least part of the transmission signal is equal to or less than the predetermined value).

As another example, where the signal path (the third signal path 961) included in the electronic device 900 is defective, the transmission signal may not be transmitted, or the amplitude of the transmission signal may be low. In this case, the attenuated amplitude of the transmission signal may be larger than the attenuated amplitude of the transmission signal corresponding to a case where the signal path is normal. Where the attenuation degree of the transmission signal exceeds the predetermined value (or the amplitude of at least part of the transmission signal is equal to or less than the predetermined value), the external device 300 may determine that the signal path (the third signal path 961) included in the external device 200 is defective.

As still another example, where the second antenna 920 of the electronic device 900 is in a defective state such that the second antenna 920 is not well coupled with an antenna port, the transmission signal may not be transmitted, or the amplitude of the transmission signal may be low. In this case, the attenuated amplitude of the transmission signal may be larger than the attenuated amplitude of the transmission signal corresponding to a case where the signal path is normal. Where the attenuation degree of the transmission signal exceeds the predetermined value (or the amplitude of at least part of the transmission signal is equal to or less than the predetermined value), the external device 300 may determine that the second antenna 920 is defective.

According to various embodiments of the disclosure, the inspection device 300 may determine failure of the electronic device 200, using information associated with at least part of the transmission signal transmitted by the electronic device 200. However, failure of the electronic device 200 may be detected by means of a processor (e.g., the processor 120 of FIG. 1) of the electronic device 200 other than the inspection device 300.

Figure 10:
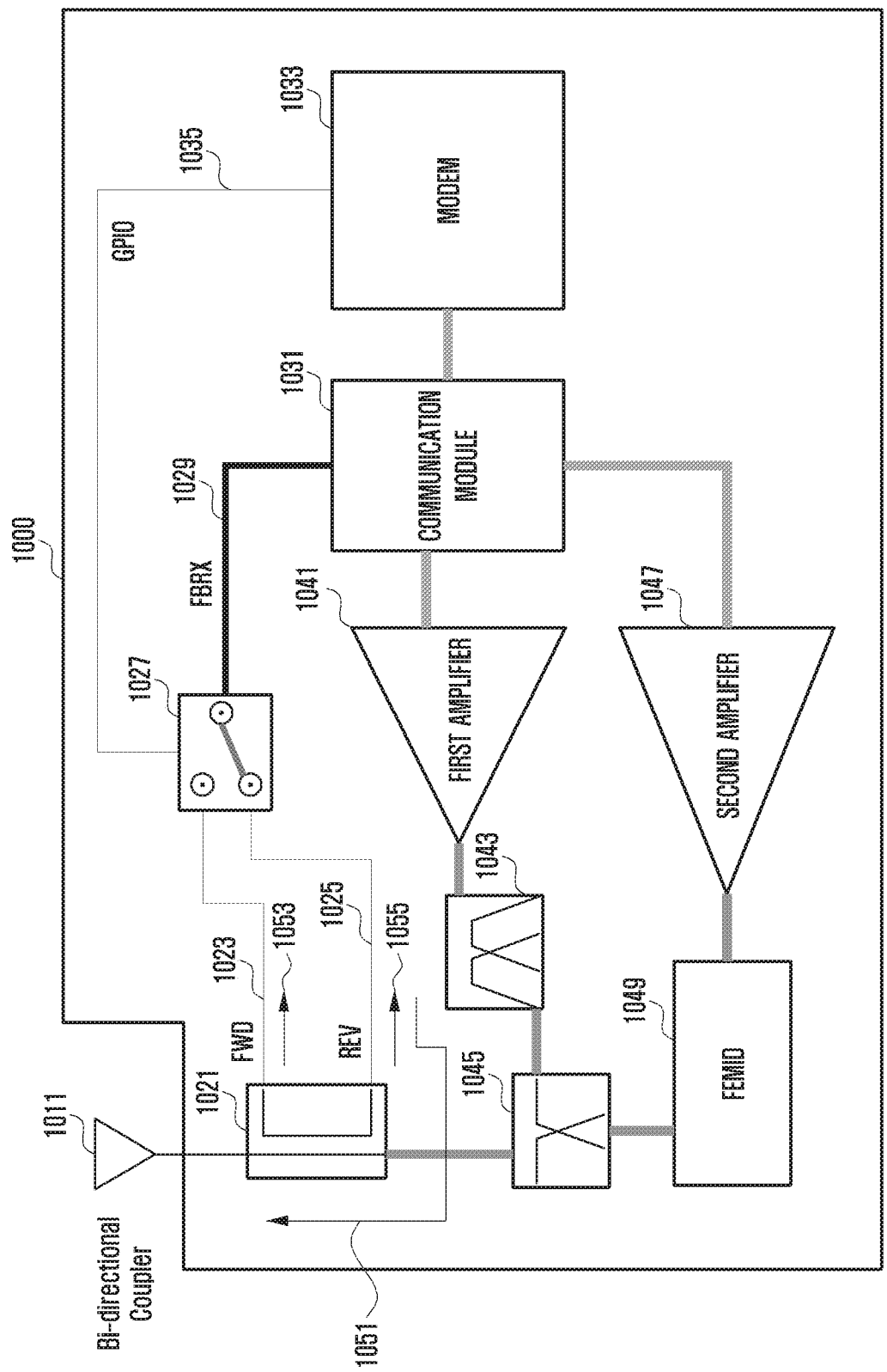
FIGS. 10 and 11 are view illustrating an electronic device according to various embodiments of the disclosure.
Figure 11:
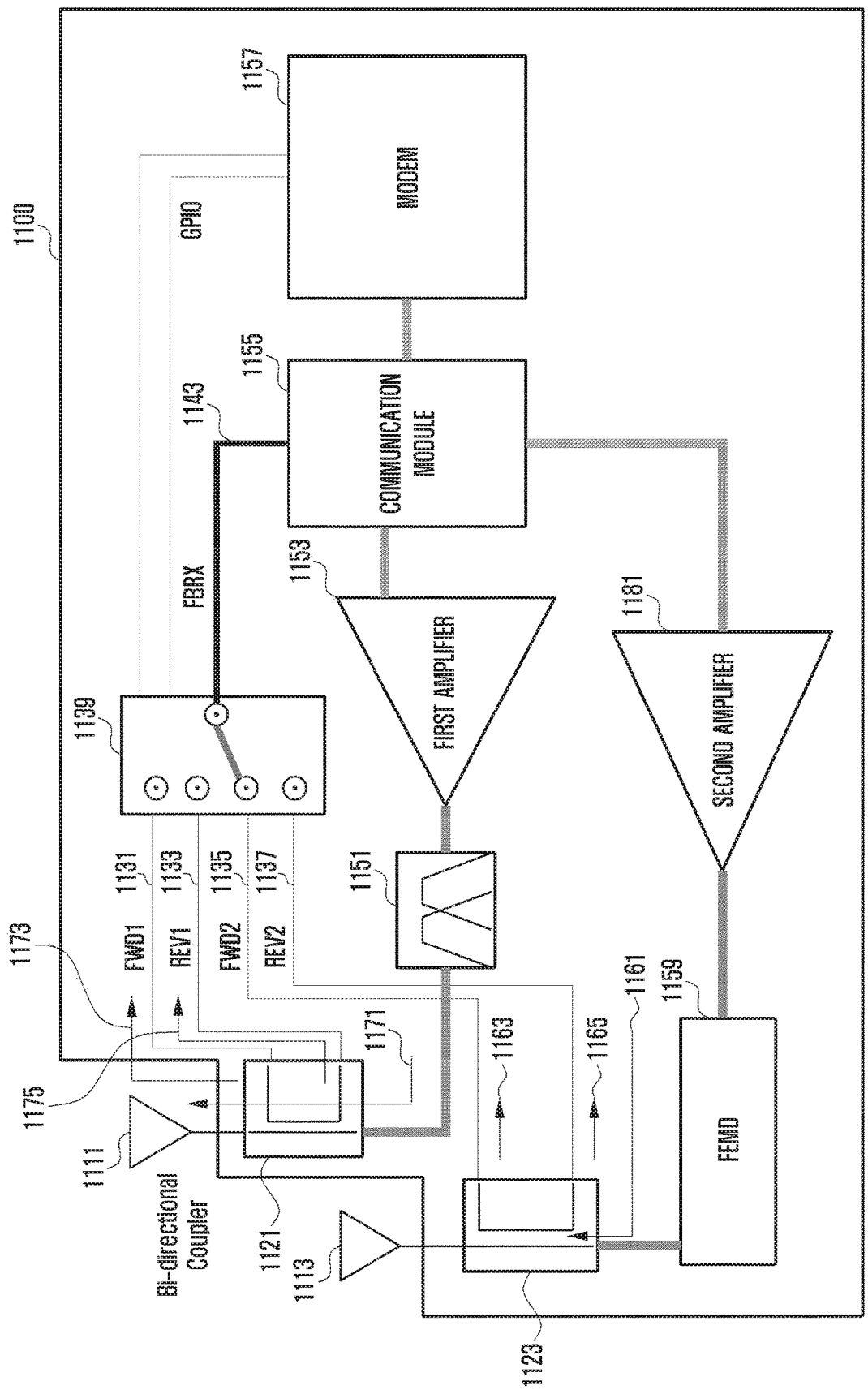

FIGS. 10 and 11 are views illustrating a communication circuit of an electronic device according to various embodiments of the disclosure.

The embodiments illustrated in FIGS. 10 and 11 are those embodiments to determine failure of a coaxial cable used for connection of a communication circuit 1000 and an antenna, failure of a circuit board used for connection of the communication circuit 1000 and an antenna 1011, failure of the antenna 1011, etc. In particular, the antenna 1011 that emits a transmission signal may fail to emit the whole transmission signal and part of the transmission signal may be transmitted. According to various embodiments of the disclosure, the communication circuit 1000 does not use any separate measuring device, compares the amplitude of a signal coupled with the transmission signal with the amplitude of a signal coupled with the reflection signal, and based on the comparison result, failure of the communication circuit 1000 may be determined. Where the antenna 1011 is defective, the amplitude of the transmission signal may be larger than in the antenna when the amplitude of the reflected signal is normal, and by use thereof, failure of the communication circuit 1000 may be determined.

Specific examples described above will be described in connection with the embodiments of FIGS. 10 and 11.

Referring to FIG. 10, the communication circuit 1100 included in an electronic device (e.g., the electronic device 101 of FIG. 1) according to various embodiments of the disclosure may include a communication module 1031, a modem 1033, a first amplifier 1041, a filter circuit 1043, a switch 1027, a bi-directional coupler 1021, and an antenna 1011, etc. Some of the components described above may be omitted according to the various embodiments.

The modem 1033 may perform modulation and demodulation of a signal for transmitting information of the electronic device 200. The modem 1033 according to various embodiments of the disclosure generates a transmission signal to determine failure of the communication circuit 1100 and transmit the transmission signal to the communication module 1031.

The communication module 1031 may transmit the transmission signal transmitted from the modem 1033 to the first amplifier 1041. The first amplifier 1041 may amplify the transmission signal and transmit the amplified transmission signal to the filter circuit 1043.

According to various embodiments of the disclosure, the filter circuit 1043 may be implemented differently according to the communication scheme. Where the electronic device 100 supports communication using frequency division duplex (FDD) in which a transmission frequency and a reception frequency are different from each other (e.g., the communication may include all the various communication schemes such as LTE-FDD, etc.), the filter circuit 1043 may be implemented by use of a duplexer. The duplexer may filter a signal corresponding to the transmission frequency and a signal corresponding to the reception frequency. Where the electronic device 100 supports communication using time division duplex (TDD) (e.g., the communication may include all the various communication schemes such as LTE-TDD), the filter circuit 1043 may be implemented in addition of at least two switch circuits. In this case, a switch circuit may connect the first signal path 220 and the filter circuit 240, and another switch circuit may connect the second signal path 260 and the filter circuit 240. The switch circuit may filter the signal in a manner of performing switching using a time corresponding to transmission and a time corresponding to reception. According to various embodiments of the disclosure, where the electronic device 100 supports communication in multiple frequency bands, the filter circuit 1043 may be implemented as a plurality of duplexers or switches according to the frequency bands that may be supported.

According to various embodiments of the disclosure, the transmission signal transmitted to the filter circuit 1043 may be transmitted to the antenna 1011 via a duplexer 1045. The antenna 1011 may emit the transmission signal.

The duplexer 1045 is in a combined form of a low pass filter and a high pass filter, functioning to separate signals corresponding to each of a plurality of bands. According to various embodiments of the disclosure, the diplexer 1045 may be omitted.

According to various embodiments of the disclosure, the antenna 1011 may be connected to the bi-directional coupler 1021. The bi-directional coupler 1021 may generate a first signal 1053 coupled with a transmission signal transmitted to the antenna 1011 for emission and a second signal 1055 coupled with a reflection signal reflected from the antenna 1011. According to various embodiments of the disclosure, the first signal 1053 may be transmitted to the communication module 1031 via the first path 1023 and the second signal 1055 may be transmitted to the communication module 1031 via the second path 1025.

The switch 1027 performs a function to connect any one of the first path 1023 and the second path 1025 to the communication module 1031. Operations by the switch 1027 may be controlled by the modem 1033 connected to the switch 1027. The switch 1027 may be controlled by the modem 1033 by use of various communication schemes such as mobile industry processor interface (MIPI), inter-integrated circuit (I2C), general-purpose input/output (GPIO), etc. Where the communication module 1031 has multiple ports rather than a single port, the switch 1027 may be omitted.

According to various embodiments of the disclosure, the communication circuit 1000 is connected to an external device (e.g., the inspection device 200 of FIG. 2) and may transmit to the electronic device 200 information for the first signal 1053 including a strength for the first signal and information for the second signal 1055 including a strength for the second signal. The external device 300 may determine failure of the communication circuit 1000 by use of the information for the first signal and the information for the second signal.

According to various embodiments of the disclosure, the external device 300 may compare the amplitude of the signal coupled with the first signal with the amplitude of the signal coupled with the second signal, and based on the comparison result, determine failure of the communication circuit 1000. For example, if the comparison result (a comparison value in the amplitude of the signal) falls in a predetermined specific range, it may be determined that the communication circuit 1000 is normal, and if the comparison result is out of the predetermined specific range, it may be determined that the communication circuit 1000 is defective.

According to various embodiments of the disclosure, the external device 300 may additionally have a memory in which values of the predetermined specific range are stored. The external device 300 may determine whether the communication circuit 1000 is defective, using the values of the predetermined specific range and the comparison value (a comparison value in the amplitude of the signal).

Referring to FIG. 11, the communication circuit 1000 included in an electronic device (e.g., the electronic device 101 of FIG. 1) according to various embodiments of the disclosure may include a communication module 1155, a modem 1157, a first amplifier 1153, a second amplifier 1181, a filter circuit 1151, a switch 1139, a first bi-directional coupler 1121, a second bi-directional coupler 1123, a first antenna 1111, and a second antenna 1113, etc.

Among the components illustrated in FIG. 11, description of the components duplicate with those of FIG. 10 will be omitted.

The communication circuit 1100 illustrated in FIG. 11 may include the first antenna 1111 and the second antenna 1113, constituting a plurality of antennas, different from the communication circuit 1000 illustrated in FIG. 10. FIG. 11 is described below under the assumption that there are two antennas, but no limitation will be applied to the number of antennas.

According to various embodiments of the disclosure, the modem 1157 may generate a transmission signal to determine failure of the communication circuit 1100 and thereafter transmit the transmission signal to the communication module 1155. The communication module 1155 may transmit the transmission signal to the first amplifier 1153 and the first amplifier 1153 may amplify the transmission signal. The amplified transmission signal may be emitted via the first antenna 1111. The transmission signal may not be entirely emitted in the first antenna 1111 and a part thereof may be reflected. The bi-directional coupler 1121 may generate a first signal 1173 coupled with a transmission signal 1171 and a second signal 1175 coupled with a reception signal and transmit the first signal and the second signal to the communication module 1155 via the first path 1131 and the second path 1133.

According to various embodiments of the disclosure, the modem 1157 may generate a transmission single to determine failure of the communication circuit 1100 and thereafter may transmit the transmission signal to the communication module 1155. The communication module 1155 transmits the transmission module to the second amplifier 1181 and the second amplifier 1181 may amplify the transmission signal. The amplified transmission signal may be emitted via the second antenna 1113. The transmission signal may not be entirely emitted in the second antenna 1113 and a part thereof may be reflected. The second bi-directional coupler 1123 may generate a third signal 1163 coupled with the transmission signal 1161 transmitted to the second antenna 1113 and a fourth signal 1165 coupled with the reflection signal reflected from the second antenna 1113 and transmit the third signal and the fourth signal to the communication module 1155 via the third path 1135 and the fourth path 1137.

According to various embodiments of the disclosure, the communication circuit 1100 may be connected to an external device (e.g., the inspection device 200 of FIG. 2) and transmit to the inspection device 200 information for the first signal 1173 including the amplitude of the first signal, information for the second signal 1175 including the amplitude of the second signal, information for the third signal 1163 including the amplitude of the third signal, and information for the fourth signal 1165 including the amplitude of the fourth signal.

The external device 300 may determine failure of the communication circuit 1100, using the information for the first signal, the information for the second signal, the information for the third signal, and the information for the fourth signal.

According to various embodiments of the disclosure, the external device 300 may compare the amplitude of a signal coupled with the transmission signal and the amplitude of a signal coupled with the reflection signal, and based on the comparison result, determine failure of the communication circuit 1100. For example, if the comparison result (a comparison between the amplitude of the first signal and the amplitude of the second signal and a comparison between the amplitude of the third signal and the amplitude of the fourth signal) falls in the predetermined specific range, it may be determined that the communication circuit 1100 is normal, but if the comparison result is out of the predetermined specific range, it may be determined that the communication unit 1100 is defective. Further, where the comparison result is out of the predetermined specific range, the external device 300 may determine failure of the communication circuit 1100 due to failure in coupling of the first antenna 1111, failure in coupling between the first antenna 1111 and the communication circuit 1100 (e.g., failures in the cable, circuit board, etc. of connecting the first antenna 1111 and the communication circuit 1100), and failure of the first antenna 1111.

According to various embodiments of the disclosure, the external device 300 may additionally have a memory in which values of predetermined specific range are stored. The external device 300 may determine whether the communication circuit 1100 is defective, using the values of the specific range stored in the memory and the comparison value (a comparison value in amplitudes of the signals).

An electronic device according to various embodiments of the disclosure may include at least one connector configured to be connected to an external device; a first signal path including an amplifier configured to amplify a signal transmitted to the outside of the electronic device; a second signal path configured to obtain another signal from the outside of the electronic device; an antenna port electrically connected to the first signal path and the second signal path via a filter circuit; and a communication module. The communication module may be configured to transmit a transmission signal to the antenna port via the first signal path, obtain at least part of the transmission signal via the second signal path, and determine failure of the electronic device based on information associated with the at least part of the transmission signal.

An electronic device according to various embodiments of the disclosure may further include a second antenna port configured to receive a diversity signal, and the communication module may be configured to emit a transmission signal corresponding to the control signal by use of the first antenna connected to the antenna port, obtain at least part of the emitted transmission signal via the third signal path connected to the second antenna port, and determine failure of the electronic device based on the transmission signal and information associated with the at least part of the transmission signal.

In an electronic device according to various embodiments of the disclosure, the communication module may be configured to transmit the transmission signal to the antenna port when the antenna port is in an opened state.

In an electronic device according to various embodiments of the disclosure, the information associated with at least part of the transmission signal may include the attenuated amplitude of the transmission signal while the transmission signal is being transmitted through the first signal path and the second signal path.

In an electronic device according to various embodiments of the disclosure, the communication module may include a plurality of paths connected to the second signal path, and the information associated with the at least part of the transmission signal may include signal information of the transmission signal transmitted through each of the plurality of paths.

In an electronic device according to various embodiments of the disclosure, the communication module may include an amplifier connected to the plurality of paths, and the information associated with at least part of the transmission signal may include signal information of the transmission signal amplified via the amplifier.

In an electronic device according to various embodiments of the disclosure, the transmission signal may be a signal having a same frequency as the reception frequency of the electronic device.

In an electronic device according to various embodiments of the disclosure, the electronic device may include an amplifier supporting a first signal path bypass mode, and the information associated with the at least part of the transmission signal may include signal information of the transmission signal amplified via the amplifier and information of the transmission signal when the amplifier is operated in the bypass mode.

An electronic device according to various embodiments may include at least one input terminal configured to be connected to an external device; and a processor. The processor may be configured to transmit a control signal to the external device, receive information associated with at least part of the control signal transmitted from the external device to the input terminal, and detect failure of the external device based on the control signal and the information associated with at least part of the control signal.

In an electronic device according to various embodiments of the disclosure, the information associated with at least part of the control signal may include the degree of the amplitude attenuation of the control signal transmitted via a signal path included in the external device. The processor may be configured to detect failure of the external device based on the degree of the amplitude attenuation of the control signal.

In an electronic device according to various embodiments of the disclosure, the information associated with the at least part of the control signal may include a signal path included in the external device and information for a component connected to the signal path. The processor may be configured to determine failure of the external device based on information for the signal path, information for the component, and the degree of the amplitude attenuation of the control signal.

In an electronic device according to various embodiments of the disclosure, the processor may identify the degree of the amplitude attenuation of the control signal corresponding to each of the plurality of signal paths, and determine whether any defective signal path is present among the plurality of signal paths based on the identification result.

In an electronic device according to various embodiments of the disclosure, the processor may be configured to determine that a signal path corresponding to a result that the degree of the amplitude attenuation of the control signal is equal to or larger than the predetermined value is defective.

In an electronic device according to various embodiments of the disclosure, the processor may be configured to determine that a component connected to the plurality of signal paths in common is defective where the degree of the amplitude attenuation of the control signal in all the plurality of signal paths is equal to or larger than the predetermined value.

In an electronic device according to various embodiments of the disclosure, the component connected to the signal path may include an amplifier, and the processor may be configured to determine failure of the external device based on signal information of the transmission signal amplified via the amplifier, included in the information associated with the at least of the transmission signal.

In an electronic device according to various embodiments of the disclosure, the processor may be configured to identify whether the amplifier supports the bypass mode, in response to the identification that the amplifier supports the bypass mode, control the external device so as to allow the amplifier to be operated in the bypass mode, and determine failure of the external device based on signal information of the transmission signal amplified via the amplifier, which is included in the information associated with at least part of the transmission signal, and information of the transmission signal when the amplifier is operated in the bypass mode.

In an electronic device according to various embodiments of the disclosure, the information associated with the at least part of the control signal may include the degree of the amplitude attenuation of the control signal transmitted via a signal path included in the external device in a state that the antenna port of the external device is opened.

An electronic device according to various embodiments of the disclosure may include at least one connector configured to be connected to an external device; a first signal path including an amplifier configured to amplify a signal transmitted to the outside of the electronic device; a second signal path configured to obtain another signal from the outside of the electronic device; a first antenna port electrically connected to the first signal path via a filter circuit; a second antenna port electrically connected to the second signal path; and a communication module. The communication module may be configured to: receive a control signal from the external device; transmit a transmission signal corresponding to the control signal to the first antenna port via the first signal path; emit the transmission signal using a first antenna connected to the first antenna port; receive the emitted signal using a second antenna connected to the second antenna port; obtain at least part of the transmission signal via the second signal path; and determine failure of the electronic device based on the transmission signal and information associated with at least part of the transmission signal.

In an electronic device according to various embodiments of the disclosure, the information associated with at least part of the transmission signal may include attenuated amplitude of the transmission signal while the transmission signal is being transmitted via the first signal path and the second signal path.

In an electronic device according to various embodiments of the disclosure, the second signal path may include an amplifier, and the communication module may be configured to determine failure of the electronic device based on information associated with a signal in which noise received through the second antenna is amplified by the amplifier.

An electronic device according to various embodiments of the disclosure may include at least one connector configured to be connected to an external device; a first signal path including an amplifier configured to amplify a signal transmitted to the outside of the electronic device; a second signal path configured to obtain another signal from the outside of the electronic device; an antenna port electrically connected to the first signal path and the second signal path via a filter circuit; an antenna connected to the antenna port; a coupler connected to the antenna, generating a first signal coupled with a transmission signal transmitted to the antenna and a second signal coupled with a signal reflected from the antenna; and a communication module. The communication module may be configured to: receive a control signal from the external device; transmit a transmission signal corresponding to the control signal to the antenna port via the first signal path; control the antenna to emit the transmission signal; obtain the first signal and the second signal via the second signal path; and determine failure of the electronic device based on information associated with the first signal and information associated with the second signal.

Figure 12:
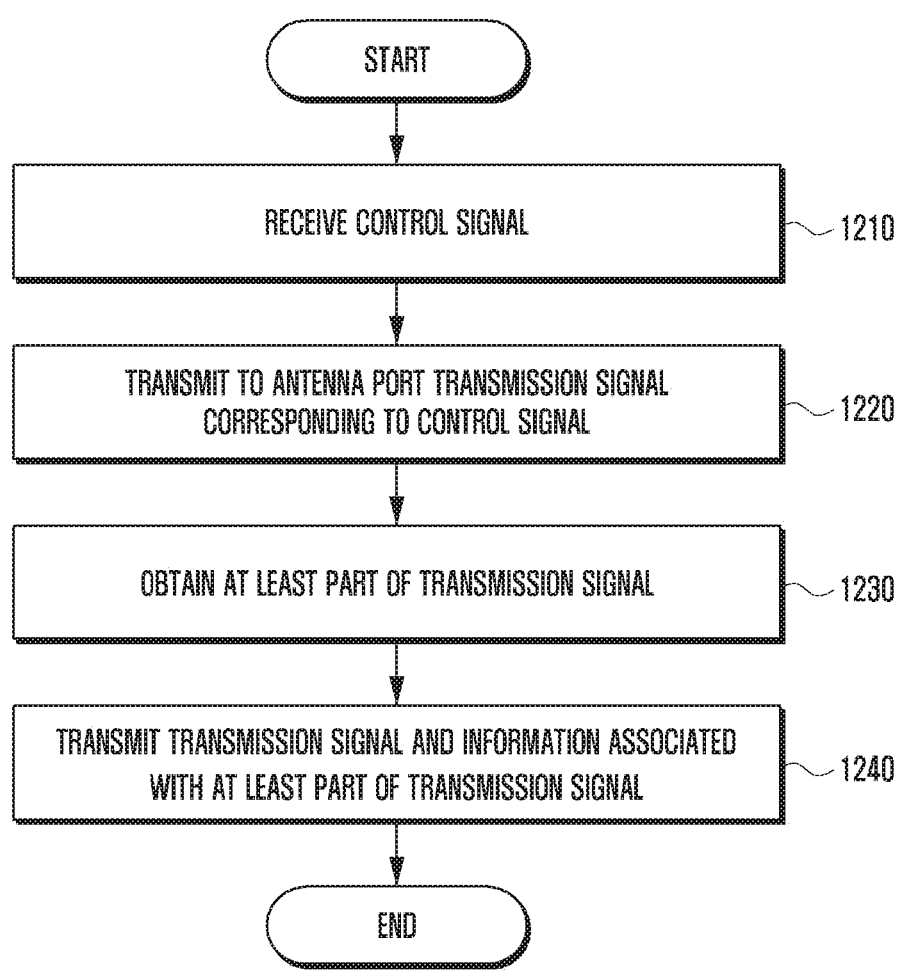
FIG. 12 is an operational flow chart illustrating a method of operating an electronic device according to various embodiments of the disclosure.

FIG. 12 is an operational flow chart illustrating a method of operating an electronic device according to various embodiments of the disclosure.

Referring to FIG. 12, in a method of operating an electronic device according to various embodiments of the disclosure, a communication module (e.g., the communication module 210 of FIG. 3) may receive a control signal in operation 1210.

According to various embodiments of the disclosure, the control signal may be a control signal to inspect failure of various components or signal paths included in the electronic device 200.

In operation 1220, the communication module 210 may transmit a transmission signal corresponding to the control signal to an antenna port (e.g., the antenna port 250 of FIG. 3).

According to various embodiments of the disclosure, the communication module 210 may receive a control signal from an external device 300 and transmit a transmission signal corresponding to the control signal to the antenna port 250 via the first signal path 220.

In operation 1230, the communication module 210 may obtain at least part of the transmission signal. According to various embodiments of the disclosure, the at least part of the transmission signal may be a signal that is leaked out from the transmission signal and transmitted to the second signal path 220. The communication module 210 may obtain at least part of the transmission signal via the second signal path (e.g., the second signal path of FIG. 3).

In operation 1240, the communication module 210 may transmit the transmission signal and information associated with at least part of the transmission signal to an external device (e.g., the inspection device 300 of FIG. 3).

The external device 300 may determine failure of the electronic device 200 based on the information associated with the at least part of the transmission signal.

According to various embodiments of the disclosure, the information associated with the at least part of the transmission signal may include information for the attenuated amplitude of the transmission signal while the transmission signal is being transmitted via the first signal path 220 and the second signal path 260.

According to various embodiments of the disclosure, the external device 300 may store information used in determining failure of the electronic device 200 according to the degree of the amplitude attenuation of the signal (e.g., the information may be implemented in a table in which the degree of the amplitude attenuation of the signal is mapped with failure or not of the electronic device 200, but no limitation is applied to the table form). The external device 300 may identify the degree of the amplitude attenuation of the signal and determine failure of the external device according to the degree of the amplitude attenuation of the signal using the table stored in a memory. For example, a table in which the external device 200 is determined to be defective where the degree of the amplitude attenuation of the signal is equal to or larger than (or exceeds) the predetermined value may be stored in the memory.

Figure 13:
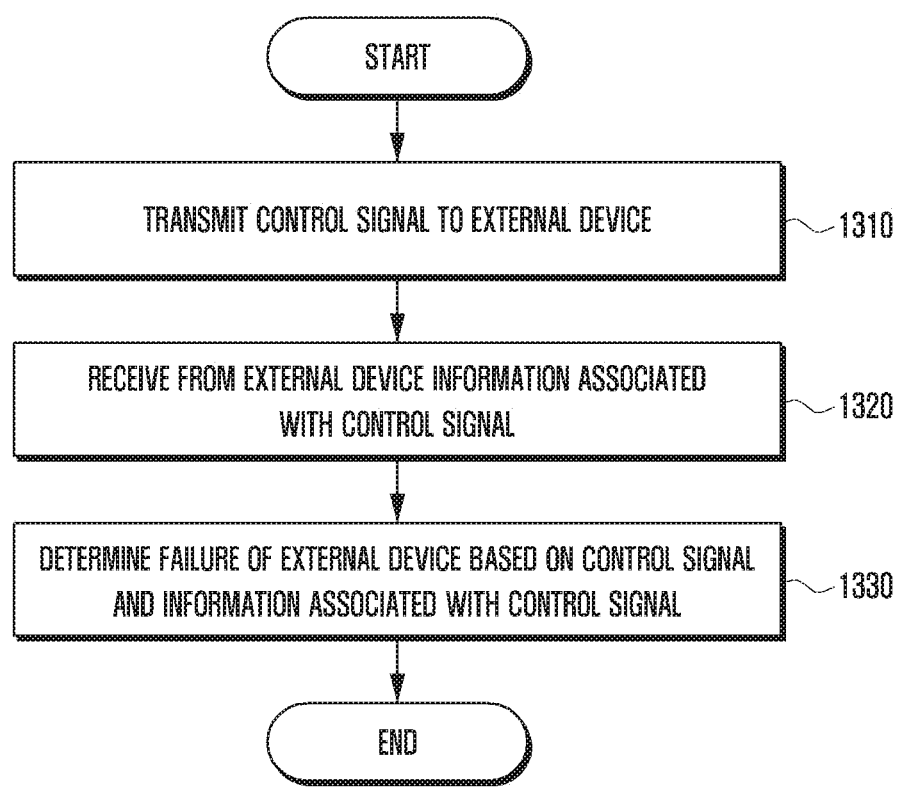
FIG. 13 is an operational flow chart illustrating a method of operating an inspection device according to various embodiments of the disclosure.

FIG. 13 is an operational flow chart illustrating a method of operating an inspection device according to various embodiments of the disclosure.

Referring to FIG. 13, in a method of operating an electronic device according to various embodiments of the disclosure, a control signal may be transmitted to an external device (e.g., the electronic device 200 of FIG. 2) in operation 1310.

According to various embodiments of the disclosure, the control signal may be a signal to control an operation to inspect failure of various components or signal paths included in the external device 200.

In operation 1320, the inspection device (e.g., the inspection device 300 of FIG. 2) may receive from the external device 200 information associated with the control signal.

In a state that an antenna terminal (e.g., the antenna terminal 250 of FIG. 3) of the external device is opened, the external device 200 may transmit a transmission signal corresponding to the control signal to the antenna terminal 250 via the first signal path (e.g., the first signal path 220 of FIG. 2). Part of the signal transmitted to the antenna terminal 250 may be leaked out and transmitted to the communication module (e.g., the communication module 210 of FIG. 3) of the external device 200. The external device 200 may transmit to the inspection device 300 information associated with at least part of the control signal, including information associated with the part of the transmission signal transmitted to the communication module.

According to another embodiment of the disclosure, even in a state that an antenna is connected to the antenna terminal 250 of the external device 200, part of the transmission signal transmitted to the antenna terminal 250 may be leaked and transmitted to the communication module 210 of the external device 200. The external device 200 may transmit to the inspection device 300 information associated with at least part of the control signal, including information associated with at least part of the transmission signal transmitted to the communication module.

In operation 1330, the inspection device 300 may determine failure of the external device based on the control signal and information associated with the control signal.

According to various embodiments of the disclosure, the information associated with at least part of the control signal may include the degree of the amplitude attenuation of the transmission signal transmitted via the signal path included in the external device 200, and the processor 310 may determine failure of the external device 200 based on the degree of the amplitude attenuation of the signal.

According to various embodiments of the disclosure, the external device 300 may store information used in determining failure of the electronic device 200 according to the degree of the amplitude attenuation of the signal (e.g., the information may be implemented in a table in which the degree of the amplitude attenuation of the signal is mapped with failure or not of the electronic device 200, but no limitation is applied to the table form). The external device 300 may identify the degree of the amplitude attenuation of the signal and determine failure of the external device according to the degree of the amplitude attenuation of the signal using the table stored in a memory. For example, a table in which the external device 200 is determined to be defective where the degree of the amplitude attenuation of the signal is equal to or larger than (or exceeds) the predetermined value may be stored in the memory.

Figure 14:
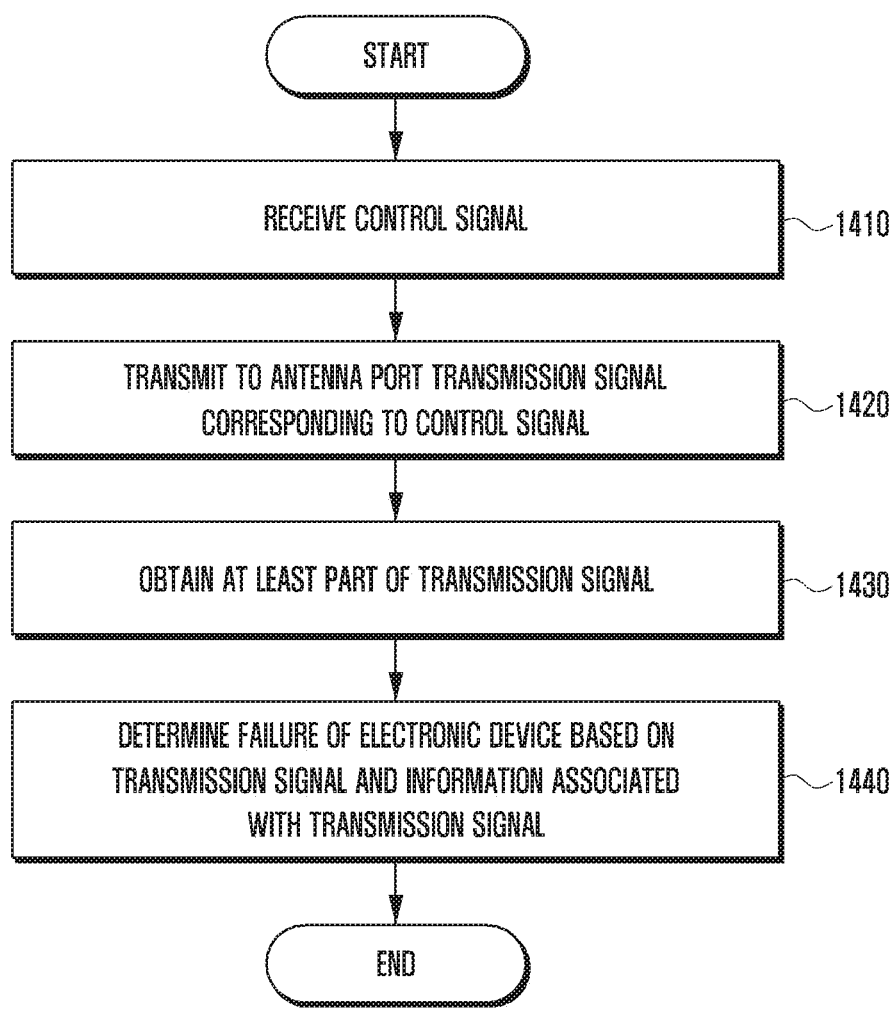
FIG. 14 is an operational flow chart illustrating a method of operating an electronic device according to various embodiments of the disclosure.

FIG. 14 is an operational flow chart illustrating a method of operating an electronic device according to various embodiments of the disclosure.

Referring to FIG. 14, in a method of operating an electronic device according to various embodiments of the disclosure, a communication module (e.g., the communication module 210 of FIG. 3) may receive a control signal in operation 1410.

According to various embodiments of the disclosure, the control signal may be a control signal to inspect failure of various components or signal paths included in the electronic device 200.

In operation 1420, the communication module 210 may transmit a transmission signal corresponding to the control signal to an antenna port (e.g., the antenna port 250 of FIG. 3).

According to various embodiments of the disclosure, the communication module 210 may receive a control signal from the external device 300 and transmit a transmission signal corresponding to the control signal to the antenna port 250 via the first signal path 220.

In operation 1430, the communication module 210 may obtain at least part of the transmission signal. According to various embodiments of the disclosure, the at least part of the transmission signal may be a signal that is leaked out form the transmission signal and transmitted to the second signal path 220. The communication module 210 may obtain the at least part of the transmission signal via the second signal path (e.g., the second signal path of FIG. 3).

In operation 1440, the communication module 210 may determine failure of the electronic device based on the transmission signal and information associated with the at least part of the transmission signal.

According to various embodiments of the disclosure, the information associated with the at least part of the transmission signal may include information for the attenuated amplitude of the transmission signal while the transmission is being transmitted through the first signal path 220 and the second signal path 260.

According to various embodiments of the disclosure, the electronic device 200 may store information used in determining failure of the electronic device 200 according to the degree of the amplitude attenuation of the signal (e.g., the information may be implemented in a table in which the degree of the amplitude attenuation of the signal is mapped with failure or not of the electronic device 200, but no limitation is applied to the table form). The communication module 210 of the electronic device 200 may identify the degree of the amplitude attenuation of the signal and determine failure of the external device according to the degree of the amplitude attenuation of the signal using the table stored in a memory. For example, a table in which the external device 200 is determined to be defective where the degree of the amplitude attenuation of the signal is equal to or larger than (or exceeds) the predetermined value may be stored in the memory.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related components. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or through a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, configured to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is transitorily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online through an application store (e.g., Play Store™), or between two user devices (e.g., smart phones) directly. If distributed online, at least part of the computer program product may be transitorily generated or at least transitorily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   at least one connector configured to be connected to an external device;
   a first signal path including an amplifier configured to amplify a signal to be transmitted to the outside of the electronic device;
   a second signal path configured to obtain another signal from the outside of the electronic device;
   an antenna port electrically connected to the first signal path and the second signal path via a filter circuit; and
   a communication module,
   wherein the communication module is configured to:
      transmit a transmission signal to the antenna port via the first signal path;
      obtain at least part of the transmission signal via the second signal path; and
      determine failure of the electronic device based on the transmission signal and information associated with the at least part of the transmission signal.

2. The electronic device as claimed in claim 1, further comprising a second antenna port configured to receive a diversity signal,
   wherein the communication module is configured to:
   emit a transmission signal corresponding to a control signal, using a first antenna connected to the antenna port;
   obtain at least part of the emitted transmission signal via a third signal path connected to the second antenna port; and
   determine failure of the electronic device based on the transmission signal and information associated with the at least part of the transmission signal.

3. The electronic device as claimed in claim 1, wherein the communication module is configured to transmit the transmission signal to the antenna port when the antenna port is in an opened state.

4. The electronic device as claimed in claim 1, wherein the information associated with at least part of the transmission signal comprises attenuated amplitude of the transmission signal while the transmission signal is being transmitted via the first signal path and the second signal path.

5. The electronic device as claimed in claim 1, wherein the communication module comprises a plurality of paths connected to the second signal path, and
   the information associated with at least part of the transmission signal comprises signal information of the transmission signal transmitted through each of the plurality of paths.

6. The electronic device as claimed in claim 1, wherein the communication module comprises an amplifier connected to a plurality of paths, and
   the information associated with at least of the transmission signal comprises signal information of the transmission signal amplified through the amplifier.

7. The electronic device as claimed in claim 1, wherein the transmission signal is a signal having a same frequency as a reception frequency of the electronic device.

8. The electronic device as claimed in claim 1, wherein the first signal path comprises an amplifier that supports a bypass mode, and
   the information associated with at least of the transmission signal comprises signal information of the transmission signal amplified through the amplifier and information of the transmission signal when the amplifier is operated in the bypass mode.

9. An electronic device comprising:
   at least one connector configured to be connected to an external device;
   a first signal path including an amplifier configured to amplify a signal to be transmitted to the outside of the electronic device;
   a second signal path configured to obtain another signal from the outside of the electronic device;
   a first antenna port electrically connected to the first signal path and the second signal path via a filter circuit;
   a second antenna port electrically connected to the second signal path; and
   a communication module,
   wherein the communication module is configured to:
      receive a control signal from an external device;
      transmit a transmission signal corresponding to the control signal to the first antenna port via the first path signal;
      emit the transmission signal using a first antenna connected to the first antenna port;
      receive the emitted signal using a second antenna connected to the second antenna port;
      obtain at least part of the transmission signal via the second signal path; and
      determine failure of the electronic device based on the transmission signal and information associated with at least part of the transmission signal.

* * * * *